United States Patent
Yu et al.

(10) Patent No.: US 12,463,446 B2
(45) Date of Patent: Nov. 4, 2025

(54) CHARGING CONTROL APPARATUS AND CHARGING CONTROL METHOD

(71) Applicant: LG Energy Solution, Ltd., Seoul (KR)

(72) Inventors: Hye-In Yu, Daejeon (KR); Ji-Eun Lee, Daejeon (KR); Ji-Su An, Daejeon (KR); Tae-Kyung Whang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/670,150

(22) Filed: May 21, 2024

(65) Prior Publication Data

US 2024/0396351 A1 Nov. 28, 2024

(30) Foreign Application Priority Data

May 22, 2023 (KR) .................. 10-2023-0065907
Mar. 6, 2024 (KR) .................. 10-2024-0032180
May 9, 2024 (KR) .................. 10-2024-0061358

(51) Int. Cl.
*H02J 7/00* (2006.01)
*G01R 31/388* (2019.01)
(Continued)

(52) U.S. Cl.
CPC ........ *H02J 7/00712* (2020.01); *G01R 31/388* (2019.01); *G01R 31/389* (2019.01);
(Continued)

(58) Field of Classification Search
CPC .. H02J 7/00712; H02J 7/0047; G01R 31/389; G01R 31/388; H01M 10/44; H01M 10/48; H01M 2220/20; B60L 53/62
(Continued)

(56) References Cited

U.S. PATENT DOCUMENTS

2005/0269991 A1 12/2005 Mitsui et al.
2014/0084846 A1 3/2014 Berkowitz et al.
(Continued)

FOREIGN PATENT DOCUMENTS

JP 2004-093551 A 3/2004
JP 2013-85386 A 5/2013
(Continued)

OTHER PUBLICATIONS

Written Opinion of the International Searching Authority for Application No. PCT/KR2024/006910 mailed Sep. 13, 2024. 6 pgs.

*Primary Examiner* — Nathaniel R Pelton
(74) *Attorney, Agent, or Firm* — Lerner David LLP

(57) ABSTRACT

The charging control apparatus according to the present disclosure includes a voltage sensor configured to detect the voltage of a battery cell and a controller configured to execute an intermittent charging process to alternately repeat a charging mode and a resting mode for the battery cell. Under the condition that the charging mode is switched to the resting mode while the intermittent charging process is being executed, the controller is configured to execute: an operation of determining an internal resistance of the battery cell based on an amount of change in voltage of the battery cell in a resting period where the resting mode continues; and an operation of recording the internal resistance in association with SOC of the battery cell.

13 Claims, 17 Drawing Sheets

(51) Int. Cl.
  *G01R 31/389*  (2019.01)
  *H01M 10/44*  (2006.01)
  *H01M 10/48*  (2006.01)
  *B60L 53/62*  (2019.01)

(52) U.S. Cl.
  CPC ........... *H01M 10/44* (2013.01); *H01M 10/48* (2013.01); *H02J 7/0047* (2013.01); *B60L 53/62* (2019.02); *H01M 2220/20* (2013.01)

(58) Field of Classification Search
  USPC ........................................................ 320/157
  See application file for complete search history.

(56) References Cited

U.S. PATENT DOCUMENTS

| | | |
|---|---|---|
| 2015/0077058 A1 | 3/2015 | Jung et al. |
| 2017/0234930 A1 | 8/2017 | Lee et al. |
| 2018/0292461 A1 | 10/2018 | Kim et al. |
| 2022/0385095 A1 | 12/2022 | Nuernberger et al. |
| 2023/0398902 A1 | 12/2023 | Huang et al. |
| 2024/0210485 A1* | 6/2024 | Kouno .............. H02J 7/007182 |
| 2024/0222721 A1* | 7/2024 | Ghantous .............. H02J 7/0047 |
| 2024/0272230 A1* | 8/2024 | Xie .................... H01M 10/4285 |
| 2025/0065776 A1* | 2/2025 | Osada ..................... B60L 58/22 |

FOREIGN PATENT DOCUMENTS

| | | |
|---|---|---|
| JP | 2015104138 A | 6/2015 |
| JP | 6498792 B2 | 4/2019 |
| JP | 2019-198174 A | 11/2019 |
| JP | 2022-86165 A | 6/2022 |
| KR | 101502230 B1 | 3/2015 |
| KR | 20170023583 A | 3/2017 |
| KR | 101930647 B1 | 3/2019 |
| KR | 2019-0080102 A | 7/2019 |
| KR | 102118218 B1 | 6/2020 |
| KR | 2022-0007580 A | 1/2022 |
| KR | 2022-0040191 A | 3/2022 |
| KR | 2022-0062075 A | 5/2022 |
| KR | 2024-0066905 | 5/2024 |
| WO | 2023-283341 A2 | 1/2023 |
| WO | 2023-035160 A1 | 3/2023 |

\* cited by examiner

CHARGING CONTROL APPARATUS AND CHARGING CONTROL METHOD

CROSS-REFERENCE TO RELATED APPLICATIONS

The present application claims priority from Korean Patent Application No. 10-2023-0065907 filed on May 22, 2023, Korean Patent Application No. 10-2024-0032180 filed on Mar. 6, 2024, and Korean Patent Application No. 10-2024-0061358 filed on May 9, 2024, all of which are hereby incorporated herein by reference in their entireties.

TECHNICAL FIELD

The present disclosure relates to technology for controlling charging of a battery cell.

BACKGROUND

Recently, as the demand for portable electronic products such as laptops, video cameras, and portable phones has rapidly increased, and as the development of battery systems, energy storage batteries, robots, and satellites has begun in earnest, research on repeatedly chargeable and dischargeable high-performance batteries is actively underway.

Currently commercialized batteries include, for example, nickel cadmium batteries, nickel hydrogen batteries, nickel zinc batteries, and lithium batteries. Among these, the lithium batteries are in the spotlight because of their advantages including almost no memory effect compared to the nickel-based batteries, resulting in free charging and discharging, very low self-discharging rate, and high energy density.

Recently, with the continued increase in demand for high-capacity and high-output battery cells, technologies are being proposed to charge battery cells as quickly as possible in order to shorten the charging time.

SUMMARY

The present disclosure provides an apparatus and method for calculating the internal resistance of a battery for each resting mode while alternately repeating a charging mode and a resting mode depending on charging progress conditions of battery cells and monitoring the history of change in the internal resistance due to multiple executions of the resting mode.

In addition, the present disclosure provides an apparatus and method for deriving the depth of charge (DOC) of a battery cell capable of avoiding lithium plating from the history of change in the internal resistance under specific charging progress conditions.

Other uses and advantages of the present disclosure can be understood from the following description, and will be more apparently appreciated from the embodiments of the present disclosure. In addition, it will be readily appreciated that the uses and advantages of the present disclosure can be implemented by features and combinations thereof set forth in the claims.

A charging control apparatus according to an aspect of the present disclosure includes a voltage sensor configured to detect the voltage of a battery cell, and a controller configured to execute an intermittent charging process to alternately repeat a charging mode and a resting mode for the battery cell. Under the condition that switching from the charging mode to the resting mode is performed while the intermittent charging process is being executed, the controller is configured to execute: an operation of determining the internal resistance of the battery cell based on an amount of change in voltage of the battery cell in a resting period where the resting mode continues; and an operation of recording the internal resistance in association with State of Charge (SOC) of the battery cell.

The charging mode may be a mode in which a charging current with a predetermined current rate is supplied to the battery cell.

The controller may be configured to control the intermittent charging process to be switched from the charging mode to the resting mode when the duration of the charging mode reaches a first reference period of time or when the amount of increase in the SOC of the battery cell due to the charging mode reaches a reference increase amount.

The controller may be configured to control the intermittent charging process to be switched from the resting mode to the charging mode when the duration of the resting mode reaches a second reference period of time.

The controller may be configured to: determine a reference frequency from a complex impedance curve of the battery cell obtained in advance using electrochemical impedance spectroscopy (EIS) equipment; and determine the second reference period of time based on the reference frequency.

The controller may be configured to determine the second reference period of time to have a predetermined negative correspondence relationship with the reference frequency.

The controller may be configured to determine the DOC of the battery cell by analyzing a resistance time series data set representing a history of change in the internal resistance over a charging control period from initiation to termination of the intermittent charging process.

The controller may be configured to: perform curve fitting on the resistance time series data set to generate a resistance profile representing a relationship between the SOC and the internal resistance of the battery cell; and determine the DOC based on the pattern of the resistance profile.

The controller may be configured to determine the DOC to be equal to the predetermined charging termination SOC when only a continuous increase pattern in the internal resistance is identified in the resistance profile.

When a transition from an increase pattern to a decrease pattern of the internal resistance is identified in the resistance profile, the controller may be configured to determine the DOC based on the boundary SOC between the increase pattern and the decrease pattern.

When only a continuous decrease pattern of the internal resistance is identified in the resistance profile, the controller may be configured to determine the DOC based on the SOC at which a second-order derivative of the resistance profile becomes 0.

A battery pack according to another aspect of the present disclosure includes the charging control apparatus.

A battery system according to another aspect of the present disclosure includes the charging control apparatus.

A charging control method according to another aspect of the present disclosure includes executing an intermittent charging process to alternately repeat a charging mode and a resting mode for a battery cell. The charging control method further includes: determining an internal resistance of the battery cell based on the amount of change in voltage of the battery cell in a resting period where the resting mode continues; and recording the internal resistance in association with the SOC of the battery cell. These steps are performed under the condition that the switching from the charging mode to the resting mode is performed while the intermittent charging process is being executed.

The charging control method may further include determining the DOC of the battery cell by analyzing a resistance time series data set representing a history of change in the internal resistance over a charging control period from initiation to termination of the intermittent charging process.

A charging control method according to another aspect of the present disclosure includes: connecting a voltage sensor to the battery cell; executing an intermittent charging process to alternately repeat a charging mode and a resting mode for the battery cell; measuring internal resistance of the battery cell in the resting mode; recording the measured internal resistance in association with the SOC of the battery cell; and recognizing the pattern of the internal resistance based on the recorded internal resistance and SOC-associated data and determining the DOC of the battery cell based on the pattern.

The charging control method may further include performing curve fitting and differentiation of the internal resistance with respect to the SOC after the recording the internal resistance in association with the SOC of the battery cell.

According to at least one of the embodiments of the present disclosure, the internal resistance of a battery cell in each resting mode can be estimated while alternately repeating the charging mode and the resting mode depending on the charging progress conditions of the battery cell, and the history of change in the internal resistance due to multiple executions of the resting mode can be monitored. Since the history of change in the internal resistance of the battery cell reflects the signs or the presence or absence of lithium plating, the DOC, which is SOC at which the battery cell can be charged while substantially suppressing the possibility of lithium plating, can be identified from the history of change in the internal resistance.

In addition, according to at least one of the embodiments of the present disclosure, an appropriate duration of the resting mode is set based on the electrochemical impedance spectroscopy (EIS) data of the battery and an estimate of the internal resistance is calculated based on the amount of change in the voltage of the battery in the resting mode. Thus, the accuracy of the DOC can be prevented from being degraded due to excessively short or long duration of the resting mode.

The effects of the present disclosure are not limited to those mentioned above, and other effects not mentioned above will be clearly understood by a person ordinarily skilled in the art from the description of the claims.

BRIEF DESCRIPTION OF THE DRAWINGS

The following drawings attached hereto exemplify embodiments of the present disclosure and serve to further understand the technical idea of the present disclosure together with the detailed description of the disclosure to be described later. Therefore, the present disclosure should not be construed as being limited to the matters illustrated in the drawings.

Figure 1:
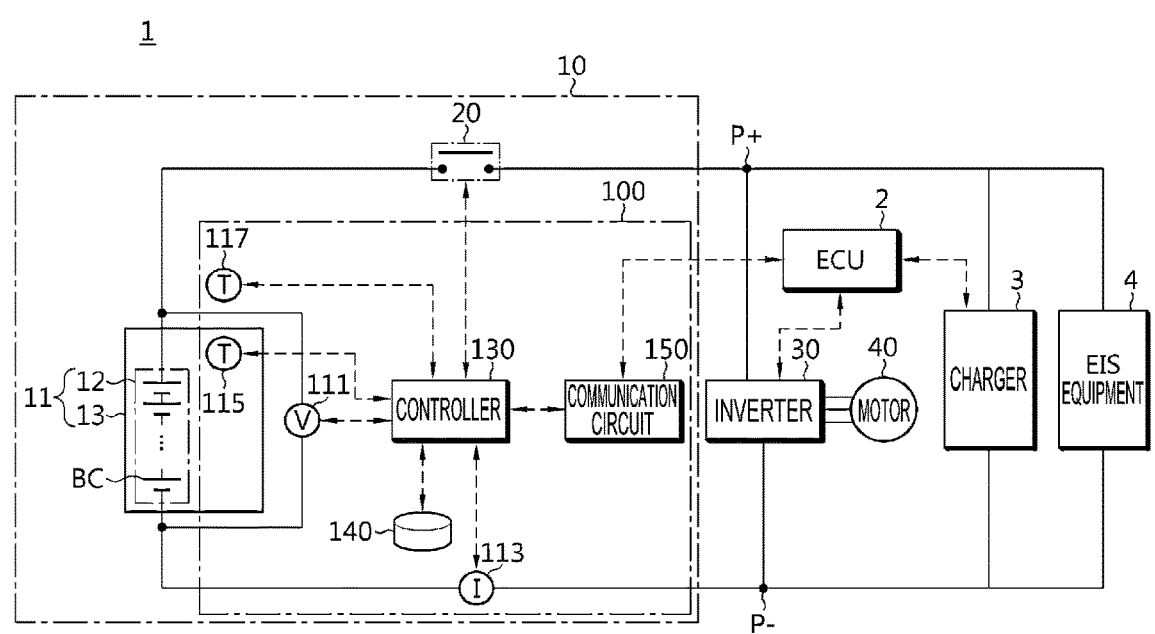
FIG. 1 is a view illustrating the configuration of a battery system according to the present disclosure.

In some of the accompanying drawings, corresponding components are given the same reference numerals. A person ordinarily skilled in the art will appreciate that the drawings illustrate elements simply and clearly and are not necessarily drawn to scale. For example, in order to aid understanding of various embodiments, the dimensions of some elements illustrated in the drawings may be exaggerated compared to other elements. In addition, elements that are useful or essential in commercially implementable embodiments but are known in the art may often not be described in order to avoid impeding the understanding of the spirit of various embodiments of the present disclosure.

DETAILED DESCRIPTION

Hereinafter, embodiments of the present disclosure will be described in detail with reference to the attached drawings. Prior to this, the terms and words used in the specification and claims should not be construed as limited to their ordinary or dictionary meanings, but should be interpreted with meanings and concepts consistent with the technical idea of the present disclosure based on a principle that the inventor may appropriately define the concepts of terms in order to explain his or her invention in the best way.

Accordingly, since the embodiments described in this description and the configurations illustrated in the drawings are merely some exemplary embodiments of the present disclosure, and do not represent all the technical ideas of the present disclosure, it should be understood that at the time of filing the present application, there may be various equivalents and modifications that may replace the embodiments.

Terms containing ordinal numbers, such as first and second, are used for the purpose of distinguishing one of the various components from the rest, and are not used to limit the components by such terms.

Throughout the specification, when a part is described as "including" a certain component, this means that other elements are not excluded, but other components may be further included, unless specifically stated otherwise. In addition, terms such as "controller" described in the specification refer to a unit that processes at least one function or operation, and the controller may be implemented in hardware, software, or a combination of hardware and software.

In addition, throughout the specification, when a part is described as being "connected" to another part, this includes not only the case where the parts are "directly connected," but also the case where the parts are "indirectly connected" with another element interposed therebetween.

When charging a battery, fast charging using a high-rate charging current may significantly reduce the charging time compared to slow charging using a low-rate charging current, but has a disadvantage of causing significant damage to the battery cells, shortening the life of the battery.

A higher charging current may more easily cause so-called "lithium plating (Li-plating)," in which the lithium ions inside a battery cell accumulate as lithium metal on the surface of the negative electrode. The amount of lithium ions that are capable of participating in the charging and discharging reaction decreases by the amount of lithium plating, and the potential imbalance between the positive electrode and the negative electrode becomes worse. Furthermore, the separator may be torn by excessively grown lithium metal, increasing the possibility of an internal short-circuit failure, and such an internal short-circuit failure increases the risk of explosion and fire of the battery cell.

The present disclosure proposes a method for deriving a fast charging protocol that makes it possible to obtain battery cell characteristic information (e.g., a relationship between SOC and internal resistance) related to the possibility of lithium plating throughout the entire life of the battery cell after its manufacture without fabricating a separate test cell (e.g., a three-electrode monocell), and to avoid lithium plating by obtaining the DOC of fast charging using the obtained information.

For example, when a medium to large-sized pouch cell applied to an electric vehicle is used repeatedly, a lithium metal deposit is generated on the surface of the negative electrode, and the resistance of the lithium metal deposit is combined in parallel with the resistance on the surface of the negative electrode. As a result, when the lithium metal deposit is generated, the total resistance on the surface of the negative electrode of the battery cell may be reduced. In this case, the impedance of the battery cell changes, and a changed impedance graph may be used to determine a reference frequency to correspond to the charging progress conditions at the time of initiating the intermittent charging process using, for example, an electrochemical impedance spectroscopy (EIS). Once the reference frequency of the intermittent charging process is determined, an appropriate resting period given during the intermittent charging process may be obtained, and during the appropriate resting period, for example, a voltage change and a resistance change due to the internal resistance of the battery cell (BC) may be observed, the DOC of the battery cell may be obtained using the voltage change and the resistance change. The theoretical background of lithium plating and surface resistance of a battery cell and the method of obtaining an appropriate resting period will be described in more detail below.

FIG. 1 is a view illustrating the configuration of a battery system according to an embodiment of the present disclosure. A battery system 1, which is described below, may obtain, for example, necessary battery cell characteristic information by being connected to a commercial secondary battery via a test jig, or directly to the secondary battery without a test jig.

Referring to FIG. 1, the battery system 1 includes a system controller (electronic control unit (ECU)) 2, a battery pack 10, a relay 20, an inverter 30, and an electric motor 40. The term, battery system 1, may encompass not only an electrical system in which a battery is used as a power source in, for example, an electric vehicle, but also a test system used to confirm/verify the electrical characteristics of the battery.

The charging and discharging terminals P+ and P− of the battery pack 10 may be electrically coupled to the inverter 30 and/or a charger 3 via a charging cable or the like. The charger 3 may be included in the battery system 1 or provided in a charging station disposed outside the battery system 1.

The system controller 2 is configured to transmit a key-on signal to the charging control apparatus 100 in response to the start button (not illustrated) provided in the battery system 1 being switched to an on-position by the user. The system controller 2 is configured to transmit a key-off signal to the charging control apparatus 100 in response to the start button being switched to an off-position by the user. The charger 3 communicates with the system controller 2 to provide charging power to a battery 11 via the charging and discharging terminals P+ and P− of the battery pack 10 according to at least one charging protocol (e.g., constant current charging, constant voltage charging, and/or constant power charging).

The battery pack 10 includes a battery 11 and a charging control apparatus 100. The charging control apparatus 100 may also serve as a battery management system (BMS) in terms of function.

The battery 11 includes a cell group 12 and a case 13. The case 13 defines the overall exterior of the battery 11 and provides an internal space where the cell group 12 may be placed. The case 13 is fixedly fastened to a battery room provided in the battery system 1 using, for example, bolts.

The cell group 12 is disposed (accommodated) in the internal space provided by the case 13 and includes at least one battery cell BC. The type of the battery cell BC is not particularly limited as long as it can be repeatedly charged and discharged, for example, like a lithium ion cell.

When the cell group 12 includes a plurality of battery cells, these battery cells may be connected to each other in series, in parallel, or in a mixture of series and parallel.

The relay 20 is electrically connected in series to the battery 11 via a power path interconnecting the battery 11 and the inverter 30. In FIG. 1, the relay 20 is illustrated as being connected between the positive electrode terminal and the charging and discharging terminals P+ of the battery 11. The relay 20 is controlled to be turned on/off in response to a switching signal from the charging control apparatus 100. According to an embodiment of the present disclosure, the relay 20 may be a mechanical contactor that is turned on/off by the magnetic force of a coil, or a semiconductor switch such as a metal oxide semiconductor field effect transistor (MOSFET).

The inverter 30 is provided to convert a DC current from the cell group 12 to an AC current in response to a command from the charging control apparatus 100 or the system controller 2.

The electric motor 40 is driven using AC power from the inverter 30. As the electric motor 40, for example, a three-phase AC motor may be used.

The charging control apparatus 100 includes a voltage sensor 111, a current sensor 113, a temperature sensor 115, a controller 130, and memory 140. The charging control apparatus 100 may further include an outdoor temperature sensor 117. The charging control apparatus 100 may further include a communication circuit 150. The charging control apparatus 100 may be included in the battery pack 10 as illustrated in FIG. 1, but is not limited thereto. The charging control apparatus 100 may be included in the battery system 1 independently of the battery pack 10. The voltage sensor 111 is connected in parallel to the battery 11 and configured to detect the battery voltage, which is the voltage across opposite terminals of the battery 11, and generate a voltage signal representing the detected battery voltage.

The voltage sensor 111 may be connected to the positive and negative electrode terminals of each battery cell BC included in the battery 11 to detect a cell voltage, which is the voltage across opposite terminals of each battery cell BC, and may output an additional voltage signal representing the cell voltage to the controller 130.

The current sensor 113 is connected in series to the battery 11 via a current path between the battery 11 and the inverter 30. The current sensor 113 is configured to detect a battery current, which is the current flowing through the battery 11, and generate a current signal representing the detected battery current. The current sensor 113 may be implemented with one or a combination of two or more of known current detection elements such as a shunt resistor and a Hall effect element.

The temperature sensor 115 is configured to detect a battery temperature and generate a temperature signal representing the detected battery temperature. The temperature sensor 115 may be disposed within the case 13 to detect a temperature close to the actual temperature of the battery 11. For example, the temperature sensor 115 may be attached to the surface of at least one battery cell BC included in the cell group 12, and may detect the surface temperature of the battery cell BC as the battery temperature. For reference, what is simply described as a "temperature detection value" herein may refer to a detected battery temperature value.

The voltage sensor 111, the current sensor 113, and the temperature sensor 115 may each be referred to as a "sensing unit."

The outdoor temperature sensor 117 is configured to detect an outdoor temperature (ambient temperature), which is the temperature of a predetermined position spaced apart from the battery 11, and generate a temperature signal representing the detected outdoor temperature. The outdoor temperature sensor 117 may be placed at a predetermined position outside the case 13 where heat exchange between the battery 11 and the outdoor air occurs.

Each of the temperature sensor 115 and the outdoor temperature sensor 117 may be implemented with one or a combination of two or more temperature detection elements such as a thermocouple, a thermistor, and a bimetal.

The communication circuit 150 is configured to support wired or wireless communication between the controller 130 and the system controller 2. The wired communication may be, for example, controller area network (CAN) communication, and the wireless communication may be, for example, Zigbee or Bluetooth communication. The type of communication protocol is not particularly limited as long as it supports wired and wireless communication between the controller 130 and the system controller 2. The communication circuit 150 may include an output device (e.g., a display or a speaker) that provides information received from the controller 130 and/or the system controller 2 in a form recognizable by the user.

The controller 130 is operably coupled to the relay 20, the voltage sensor 111, the current sensor 113, the temperature sensor 115, the outdoor temperature sensor 117, and the communication circuit 150. When two components are described as being operably coupled, it means that the two components are connected directly or indirectly to be capable of transmitting and receiving a signal unidirectionally or bidirectionally.

The controller 130 may collect a voltage signal from the voltage sensor 111, a current signal from the current sensor 113, a temperature signal from the temperature sensor 115 (which may be referred to as a "battery temperature signal"), and/or a temperature signal from the temperature sensor 117 (which may be referred to as an "outdoor temperature signal"). The controller 130 may convert each of the analog signals collected from the sensors 111, 113, 115, and 117 into a digital value using an analog-to-digital converter (ADC) provided therein and record the converted digital value.

The controller 130 may be referred to as a "control circuit" or a "battery controller" and implemented in hardware using an application specific integrated circuit (ASIC), a digital signal processor (DSP), a digital signal processing device (DSPD), a programmable logic device (PLD), a field programmable gate arrays (FPGA), a microprocessor, and an electrical unit for performing other functions.

The memory 140 may include a storage medium of at least one type selected from among a flash memory type, a hard disk type, a solid state disk (SSD) type, a silicon disk drive (SDD) type, a multimedia card micro type, a random access memory (RAM) type, a static random access memory (SRAM) type, a read-only memory (ROM) type, an electrically erasable programmable read-only memory (EEPROM) type, and a programmable read only memory (PROM) type. The memory 140 may store data and programs required for calculation operations by the controller 130. The memory 140 may store data representing the results of calculation operations by the controller 130. Although the memory 140 is illustrated in FIG. 1 as being physically independent from the controller 130, the memory may also be built in the controller 130.

The controller 130 may turn on the relay 20 in response to a key-on signal. The controller 130 may turn off the relay 20 in response to a key-off signal. The key-off signal is a signal that induces switching from a cycle state, which refers to the state in which the battery 11 is charging/discharging, to a rest state, which refers to the state in which charging/discharging of the battery 11 is stopped. Alternatively, the system controller 2 may be responsible for on/off-control of the relay 20 instead of the controller 130.

When the inverter 30 or the charger 3 operates while the relay 20 is turned on, the battery 11 is switched into the cycle state. In contrast, when the relay 20 is turned off or the operation of the inverter 30 and the charger 3 is stopped, the battery 11 is in the rest state.

Meanwhile, when the battery 11 is described as being in the cycle state or the rest state, it means that each battery cell BC included in the battery 11 is also in the cycle state or the rest state.

While the battery cell BC is in the cycle state and/or the rest state, the controller 130 may determine a voltage detection value, a current detection value, a battery temperature detection value, and an outdoor temperature detection value based on a voltage signal, a current signal, a battery temperature signal, and an outdoor temperature signal, and then determine (estimate) the state of charge (SOC) of the battery cell BC based on the voltage detection value, the current detection value, and/or the outdoor temperature value.

When the charger 3 is operating in the constant current charging mode, the current rate (which may be referred to as "C-rate") of the charging current supplied to the battery cell BC has a constant value known in advance, and in estimating the SOC of the battery cell BC, the value of the constant current output from the charger 3 may be used instead of the current detection value obtained using the current sensor 113.

The SOC is the ratio of remaining capacity to the fully charged capacity (maximum capacity) of a battery cell BC, and is usually processed as the range of 0 to 1 or 0 to 100%.

For example, an ampere counting method, an open circuit voltage (OCV)-SOC curve, or a Kalman filter may be used to determine the SOC.

The battery system 1 may further include EIS equipment 4. The EIS equipment 4 is provided to apply an AC signal to a battery cell BC and measure a response characteristic of the battery cell BC to the applied AC signal. In FIG. 1, the EIS equipment 4 is illustrated as being connected in parallel to the battery 11, but is not limited thereto. For example, the EIS equipment 4 may be selectively connected to individual battery cells BC by a separate switching circuit.

Descriptions will be made as to a process of obtaining battery cell characteristic information in the resting mode of an intermittent charging process while performing the intermittent charging process by connecting the above-described battery system 1 to a commercial secondary battery, for example, a mid to large-sized pouch cell applied to an electric vehicle, via a test jig or the like and applying the above-described appropriate resting period.

Figure 2A:
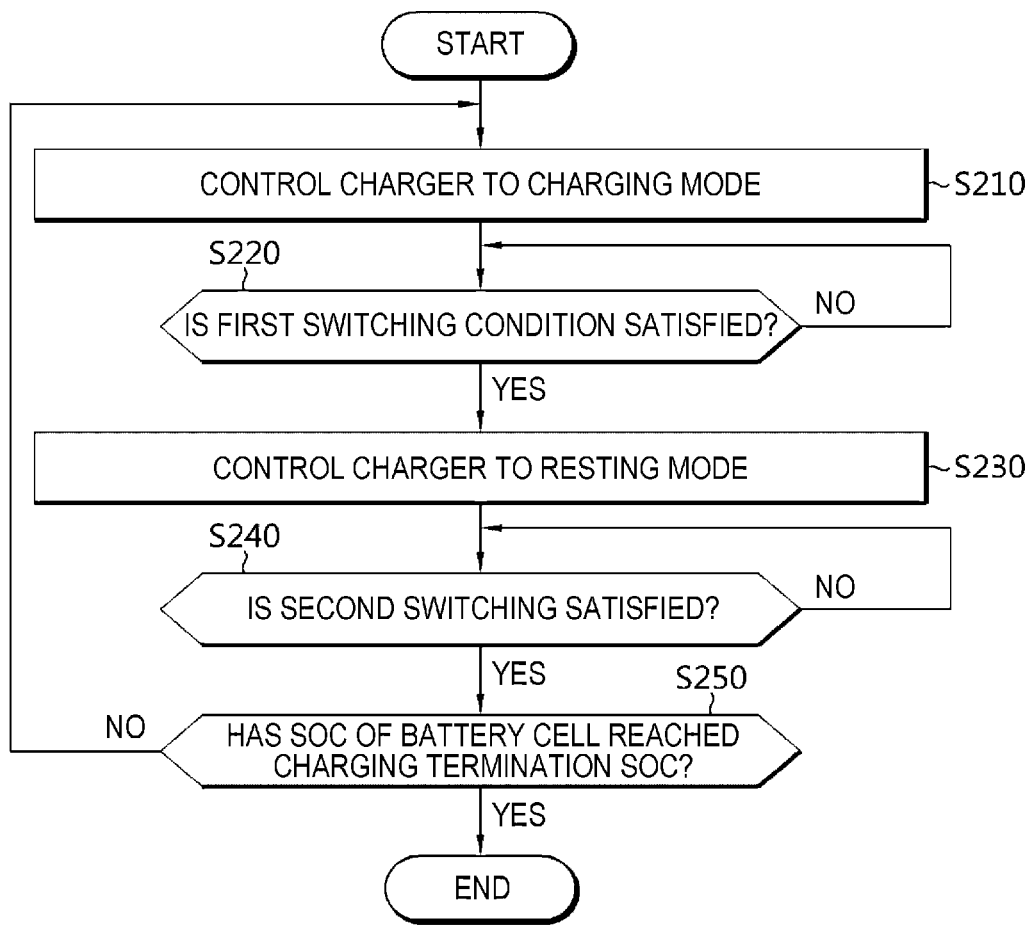
FIGS. 2A and 2B are flowcharts illustrating a charging control method according to a first embodiment of the present disclosure.
Figure 2B:
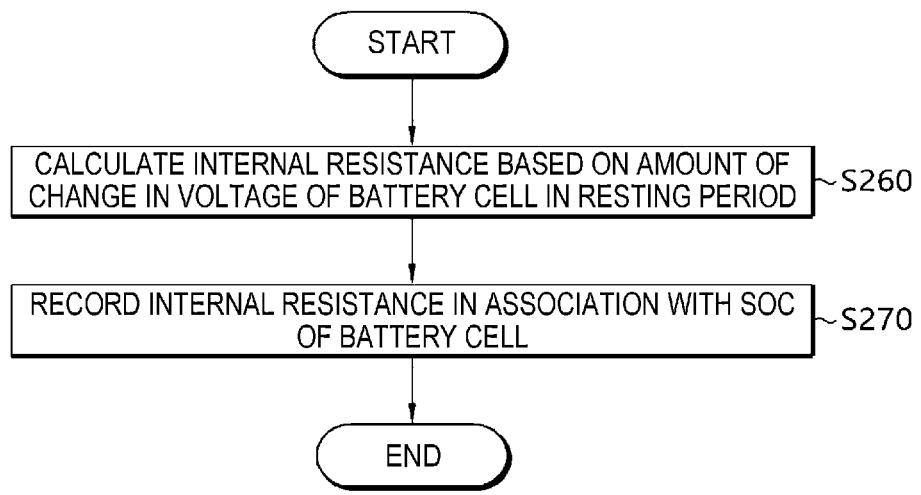

FIGS. 2A and 2B are flowcharts illustrating a charging control method according to a first embodiment of the present disclosure, and FIGS. 3 to 7 are views to be referenced in describing the method of FIGS. 2A and 2B.

The method of FIG. 2A may be executed by the charging control apparatus 100 illustrated in FIG. 1. A set of steps S210 to S250 included in FIG. 2A may be collectively referred to as control steps of an "intermittent charging process." The method of FIG. 2A may be repeatedly performed until the SOC of a battery cell BC reaches the predetermined lower limit SOC (which may be referred to as "charging initiation SOC") from the predetermined upper limit SOC (which may be referred to as "charging termination SOC").

Each of the lower limit SOC and the upper limit SOC may be set depending on the magnitude of charging current (e.g., current rate) used in the charging mode of the method of FIG. 2A and the battery temperature at the time where the method of FIG. 2A is initiated.

For example, the lower SOC and the upper SOC may be set to 88% and 97%, respectively, when the current rate and the battery temperature are 0.5 C and 25° C., respectively, and may be set to 68% and 77%, respectively, when the current rate and the battery temperature are 2 C and 25° C., respectively. Relational data between the lower limit SOC and the upper limit SOC for a current rate and a battery temperature (or outdoor temperature) may be recorded in advance in the memory 140 in the form of a lookup table and/or function.

Referring to FIGS. 1, 2A, and 2B, in step S210, the controller 130 controls the charger 3 to be in the charging mode where a charging current is supplied to a battery cell BC. For example, the controller 130 transmits a charging request signal to the charger 3 via the communication circuit 150, and the charger 3 operates in the charging mode in response to the charging request signal and supplies a charging current with a required current rate to the battery cell BC. Here, the charging mode may be, for example, a constant current charging mode in which the battery cell BC is charged with a charging current with a predetermined current rate.

In step S220, the controller 130 determines whether a first switching condition for switching from the charging mode to the resting mode is satisfied. The first switching condition may be a time-based condition or a SOC-based condition. As an example, in response to the duration of the charging mode (e.g., the elapsed time from the initiation time of the charging mode) reaching a first reference period of time, it may be determined that the first switching condition is satisfied. As another example, in response to the amount of increase in the SOC of the battery cell BC due to the charging mode (e.g., the difference between the SOC at the time of initiating the current charging mode and the current SOC) reaching a reference increase amount (e.g., 0.5%), it may be determined that the switching condition is satisfied. When the value of step S220 is "No," step S220 may be re-proceeded repeatedly. When the value of step S220 is "Yes," that is, when it is determined in S220 that the first switching condition is satisfied, the process proceeds to step S230.

In step S230, the controller 130 controls the charger 3 to be in the resting mode. Accordingly, the intermittent charging process is switched from the charging mode to the resting mode. For example, when the controller 130 transmits a charge stop signal to the charger 3 via the communication circuit 150, the charger 3 enters the resting mode in response to the charge stop signal. In the resting mode, the supply of the charging current from the charger 3 to the battery cell BC is blocked. The controller 130 may record the SOC of the battery cell BC at the time of switching from the charging mode to the resting mode in the memory 140.

In step S240, the controller 130 determines whether a second switching condition for switching from the resting mode to the charging mode is satisfied. The second switching condition may be a time-based condition. As an example, in response to the duration of the resting mode (i.e., the elapsed time from the time where the resting mode is initiated) reaching a second reference period of time, it may be determined that the second switching condition is satisfied. The second reference period of time may be a predetermined fixed period of time or a variable period adjusted by the controller 130 based on electrochemical characteristic data of the battery cell BC. Adjustment of the second reference period of time will be described separately with reference to FIG. 14. When the value of step S240 is "No," that is, when the duration of the resting mode does not reach the second reference period of time, step S240 may be re-proceeded repeatedly. When the value of step S240 is "Yes," that is, when the duration of the resting mode reaches the second reference period of time, the process may be proceeded to step S250.

In step S250, the controller 130 determines whether the SOC of the battery cell BC reaches the charging termination SOC. When the value of step S250 is "No," the process may return to step S210. For example, the intermittent charging process may be switched from the resting mode to the charging mode to repeat the charging mode and resting mode until the SOC of the battery cell BC reaches the charging termination SOC. Meanwhile, when the value of step S250 is "Yes," for example, when the SOC of the battery cell reaches the charging termination SOC, the method of FIG. 2A may be terminated.

Figure 3:
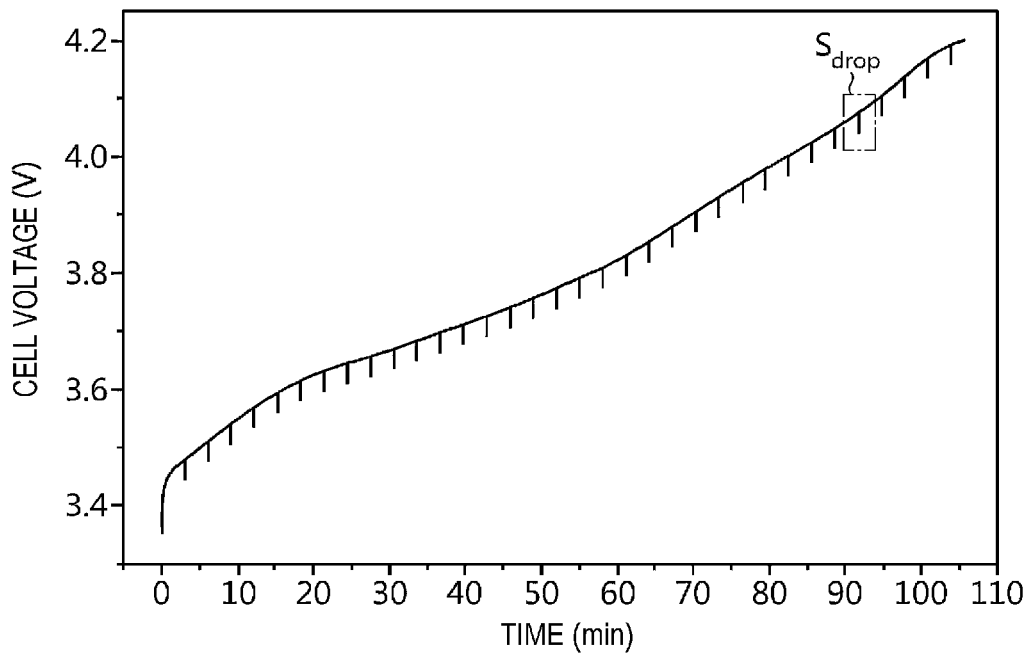
FIGS. 3 to 7 are views to be referenced in describing the method of FIGS. 2A and 2B.
Figure 4:
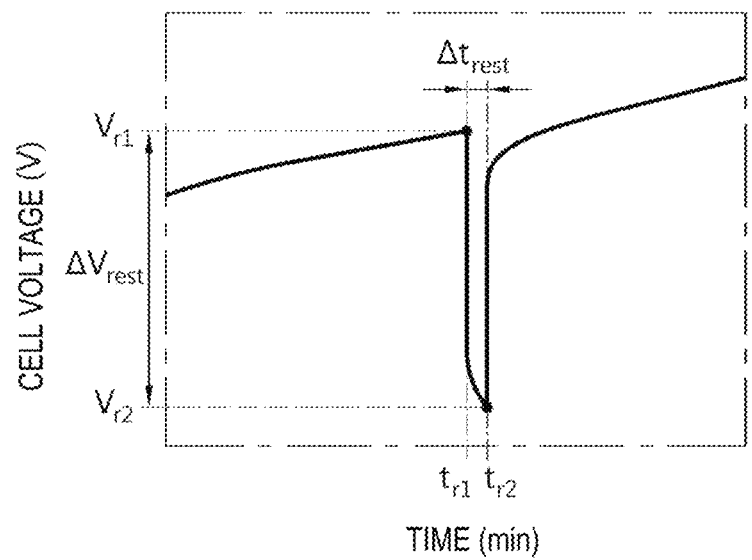

As described above, the charging mode and the resting mode may be repeated through the steps of FIG. 2A to obtain a cell voltage (V) graph over time (minutes) as illustrated in FIG. 3. The portions indicated by hatch patterns in FIG. 3 schematically illustrate the resting periods of the intermittent charging process as illustrated in FIG. 4.

The method of FIG. 2B may be executed under the condition that the decision value in step S240 of FIG. 2A is "Yes." For example, in the method of FIG. 2B, when the second switching condition is satisfied in step S240, step S260 to be described below may be executed prior to proceeding to step S250.

In step S260, the controller 130 calculates the internal resistance of the battery cell BC based on the amount of change in the voltage of the battery cell BC in the rest state, and records the internal resistance calculated in S270 in association with the SOC of the battery cell.

FIG. 3 is a graph illustrating a history of change in the cell voltage of a battery cell BC during a charging control period in which an intermittent charging process is executed. As can be seen in FIG. 3, the voltage of the battery cell BC shows an overall rising trend throughout the charging control period, and as indicated by the hatch patterns in the graph, a voltage rise section where the charger 3 operates in the charging mode and a voltage drop section where the charger 3 operates in the resting mode are alternately repeated.

FIG. 4 is an enlarged graph of a voltage drop section $S_{drop}$ in the resting mode, which is the box region marked by the dotted line in FIG. 3. In FIG. 4, $t_{r1}$ represents the time at which the charger 3 is requested to switch from a charging mode to a resting mode (or the time at which a switching event from a charging mode to a resting mode occurs), $t_{r2}$ represents the time at which the charger 3 is requested to switch from the resting mode to the charging mode (or the time at which a switching event from the resting mode to the charging mode occurs), $\Delta t_{rest}$ represents the duration in the resting mode (the time length of the resting period), $V_{r1}$ represents a cell voltage at $t_{r1}$, $V_{r2}$ represents a cell voltage at $t_{r2}$, and $\Delta V_{rest}$ represents the amount of change in voltage in the resting mode. That is, $V_{r1}$ represents the cell voltage detected just before switching from the charging mode to the resting mode, and $V_{r2}$ represents the cell voltage detected just before switching from the resting mode to the charging mode. $\Delta t_{rest}=t_{r2}-t_{r1}$, and $\Delta V_{rest}=V_{r1}-V_{r2}$.

The controller 130 may calculate (estimate) the internal resistance for each resting period using Equation 1 below.

$$R_{CT} = \frac{\Delta V_{rest}}{I_{CC}} \quad \text{(Equation 1)}$$

In Equation 1 above, $I_{CC}$ represents a charging current (e.g., a constant current with a predetermined current rate), and $R_{CT}$ represents the internal resistance.

In step S270, the controller 130 records the internal resistance obtained in step S260 in the memory 140 in association with the SOC of the battery cell BC. The SOC associated with the internal resistance may be the SOC of the battery cell BC at the time where switching from the charging mode to the resting mode is performed (e.g., the execution time of step S230).

As illustrated in FIG. 3, during the charging in an SOC range of interest (e.g., from the lower limit SOC to the upper limit SOC), the resting mode may progress multiple times (e.g., multiple resting periods are sequentially provided during the charging control period), and the estimated values of the internal resistance during the resting period that occurs each time the resting mode progress may be sequentially recorded in the memory 140 in time order.

Therefore, when the SOC of the battery cell BC reaches the upper limit SOC, a resistance time series data set (which may be referred to as an "internal resistance map") representing the history of change in the internal resistance over time may be recorded in the memory 140. Each data point in the resistance time series data set may represent a related pair of the internal resistance and the SOC determined at a specific resting period within the charging control period.

Figure 5:
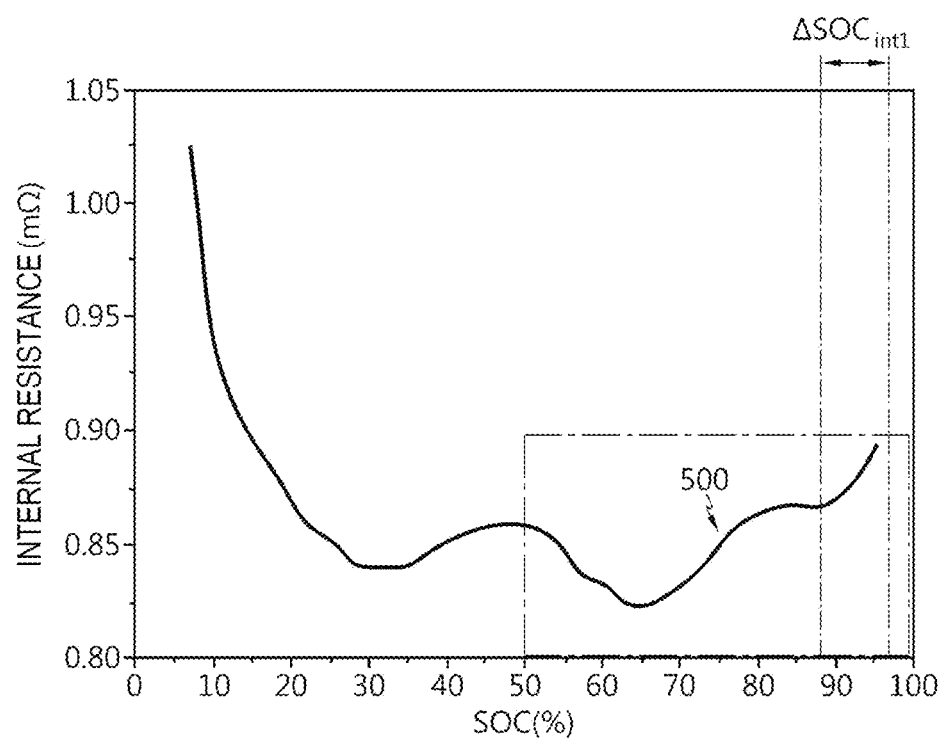
Figure 6:
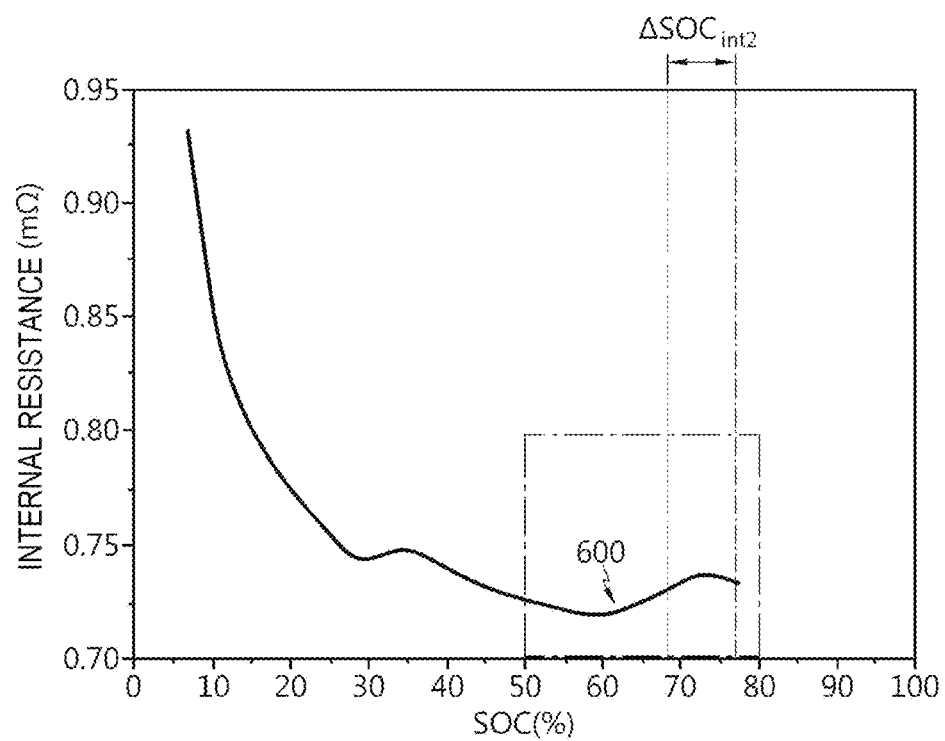
Figure 7:
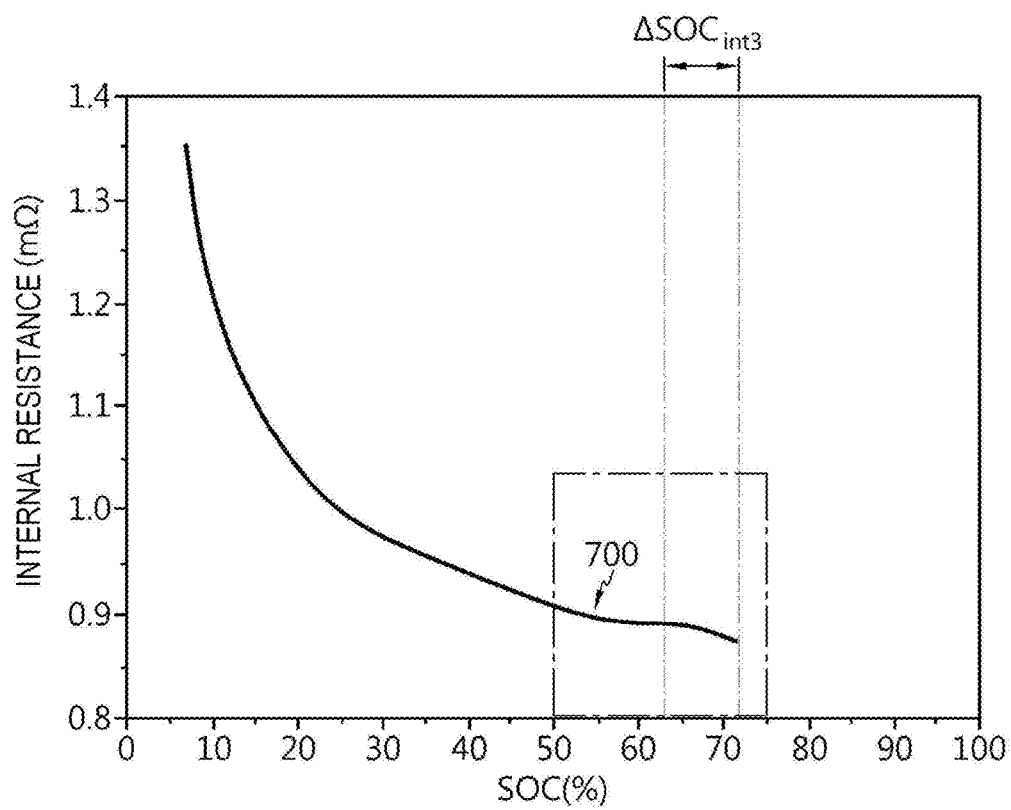

FIGS. 5 to 7 are graphs 500, 600, and 700 illustrating resistance time series data sets of three typical patterns obtained by repeating intermittent charging processes using three different charging progress conditions, respectively. For example, general shapes of charge transfer resistances obtained from the evaluation of the present disclosure may be classified into three cases illustrated in FIGS. 5, 6, and 7, respectively, which will be described below. Each figure illustrates an evaluation condition and environment. However, measurements do not necessarily have to be performed under these conditions, and intermittent charging may be performed under conditions other than those illustrated below for evaluation purpose. In the following description, the DOC may be identified more accurately when the DOC decreases (the charge transfer resistance of a battery is reduced) in the order of FIGS. 5, 6, and 7.

FIG. 5 illustrates a resistance time series data set 500 obtained by executing an intermittent charging process under a first charging progress condition in which the current rate of the charging current is 0.5 C and the battery temperature (e.g., the temperature measured at the first initiation of the intermittent charging process) is 25° C. $\Delta SOC_{int1}$ represents an SOC range of interest (e.g., 88% to 97%) in the resistance pattern associated with the first charging progress condition.

FIG. 6 illustrates a resistance time series data set 600 obtained by executing an intermittent charging process under a second charging progress condition in which the current rate of the charging current is 2 C and the battery temperature (e.g., the temperature measured at the first initiation of the intermittent charging process) is 25° C. $\Delta SOC_{in2}$ represents an SOC range of interest (e.g., 68% to 77%) in the resistance pattern associated with the second charging progress condition.

FIG. 7 illustrates a resistance time series data set 700 obtained by executing an intermittent charging process under a third charging progress condition in which the current rate of the charging current is 2 C and the battery temperature (e.g., the temperature measured at the first initiation of the intermittent charging process) is 10° C. $\Delta SOC_{int3}$ represents an SOC range of interest (e.g., 63% to 72%) in the resistance pattern associated with the third charging progress condition.

The upper limit of each SOC range of interest may be referred to as charging limit SOC.

Comparing FIGS. 5 and 6, the first charging progress condition and the second charging progress condition have the same battery temperature, but the first charging progress condition has a lower current rate than the second charging progress condition. Therefore, since the first charging progress condition is less harsh than the second charging progress condition for a battery cell, it is illustrated that the upper limit SOC associated with the first charging proceeding condition (97%) is set to be higher than the upper limit SOC associated with the second charging proceeding condition (77%).

Comparing FIGS. 6 and 7, the second charging progress condition and the third charging progress condition have the same current rate, but the third charging progress condition has a lower temperature than the second charging progress condition, and the electrochemical reaction of a battery cell BC may be relatively slower under the second charging progress condition than under the third charging progress condition. Accordingly, the upper limit SOC associated with the third charging progress condition (72%) is illustrated as being lower than the upper limit SOC associated with the second charging progress condition (77%).

FIGS. 5 to 7 each illustrate a history of change in internal resistance (reflecting charge transfer resistance) in a wider range than the SOC range of interest corresponding to each charging progress condition. However, this is only to aid understanding, and in reality, it is sufficient to acquire only the history of charge in internal resistance in the SOC range of interest corresponding to each charging progress condition.

Figure 8:
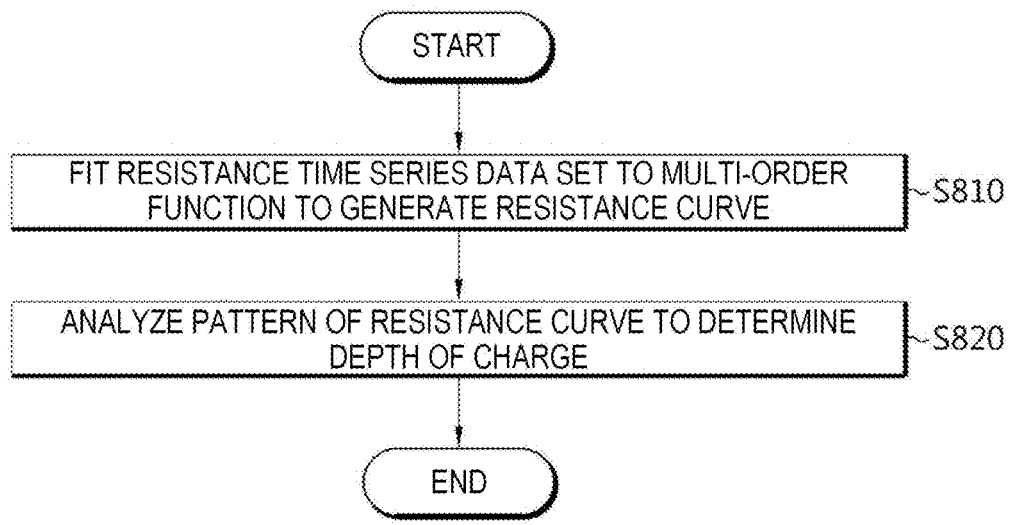
FIG. 8 is a flowchart illustrating a charging control method according to a second embodiment of the present disclosure.

FIG. 8 is a flowchart illustrating a charging control method according to a second embodiment of the present disclosure, and FIGS. 9 to 13 are graphs illustrating resistance profiles to be referenced in describing the method of FIG. 8. The method of FIG. 8 may be executed after a resistance time series data set for a charging control period is acquired by the charging control method according to the first embodiment described above with reference to FIGS. 2A and 2B.

Referring to FIG. 8, in step S810, the controller 130 performs curve fitting on the resistance time series data set to generate a resistance profile (which may be referred to as an "internal resistance profile") indicating a relationship between the SOC and the internal resistance of a battery cell BC. Curve fitting may refer to a procedure or logic for approximating an input data set to a polynomial of a predetermined order. That is, the resistance profile may be a kind of function where the input is SOC and the output is internal resistance.

Figure 9:
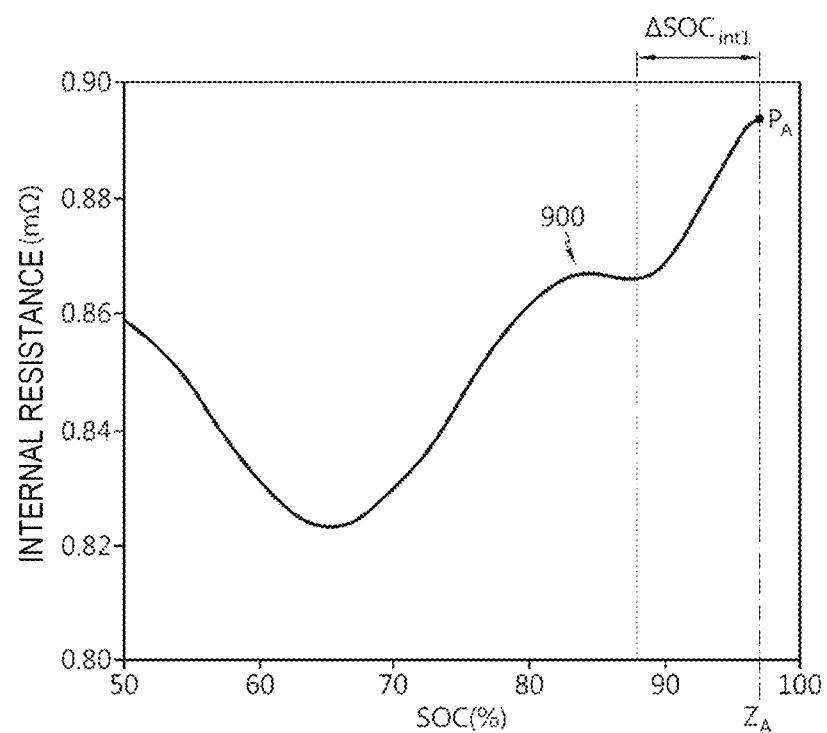
FIGS. 9 to 13 are graphs illustrating resistance profiles to be referenced in describing the method of FIG. 8.
Figure 10:
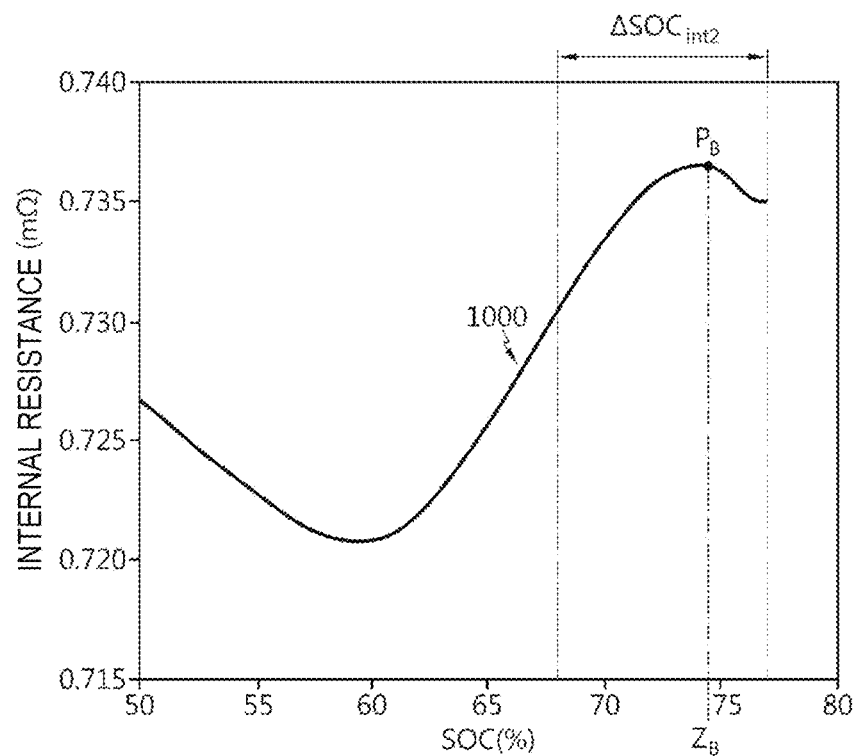
Figure 11:
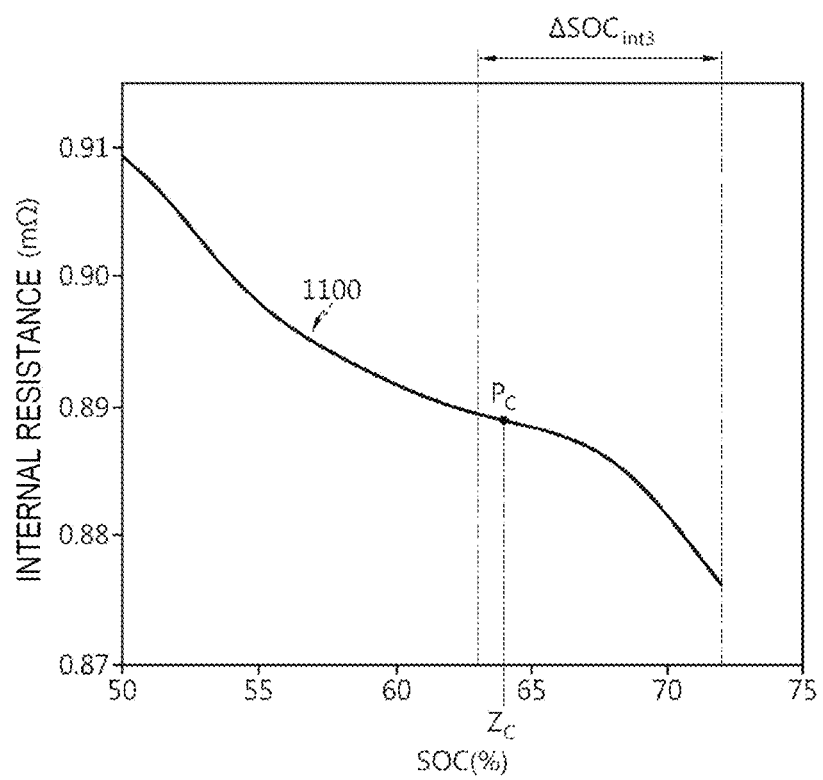

FIGS. 9 to 11 illustrate three resistance profiles 900, 1000, and 1100 obtained through curve fitting of three resistance time series data sets 500, 600, and 700 described above with reference to FIGS. 5 to 7, respectively, to 9th order polynomials, respectively. To aid understanding, the three resistance profiles 900, 1000, and 1100 are each illustrated in a range from an SOC (50%) below the lower limit SOC of each of three SOC ranges of interest ($\Delta SOC_{int1}$, $\Delta SOC_{int2}$, $\Delta SOC_{int3}$) to the upper limit SOC.

In step S820, the controller 130 determines the DOC of a battery cell BC based on the pattern of a resistance profile. The DOC represents the maximum SOC that can be charged without the occurrence of lithium plating (which may be within the SOC range of interest).

First, the operation of identifying the DOC from the resistance profile 900 of FIG. 9 obtained through curve fitting of the time series data set of FIG. 5 will be described. Referring to FIG. 9, in the SOC range of interest ($\Delta SOC_{int1}$), the internal resistance is continuously increasing without a decreasing range. As illustrated in FIG. 9, when a continuous increase pattern in internal resistance is identified as the SOC increases, the controller 130 may determine the SOC ($Z_A$) at the termination point PA on the resistance profile 900 as the DOC ($Z_A$). That is, in the case of the pattern form illustrated in FIG. 9, the DOC ($Z_A$) may be determined to be equal to the upper limit SOC of the SOC range of interest ($\Delta SOC_{int1}$). An increase pattern in a certain profile (or curve) may mean that the first-order derivative of that profile is positive.

Figure 12:
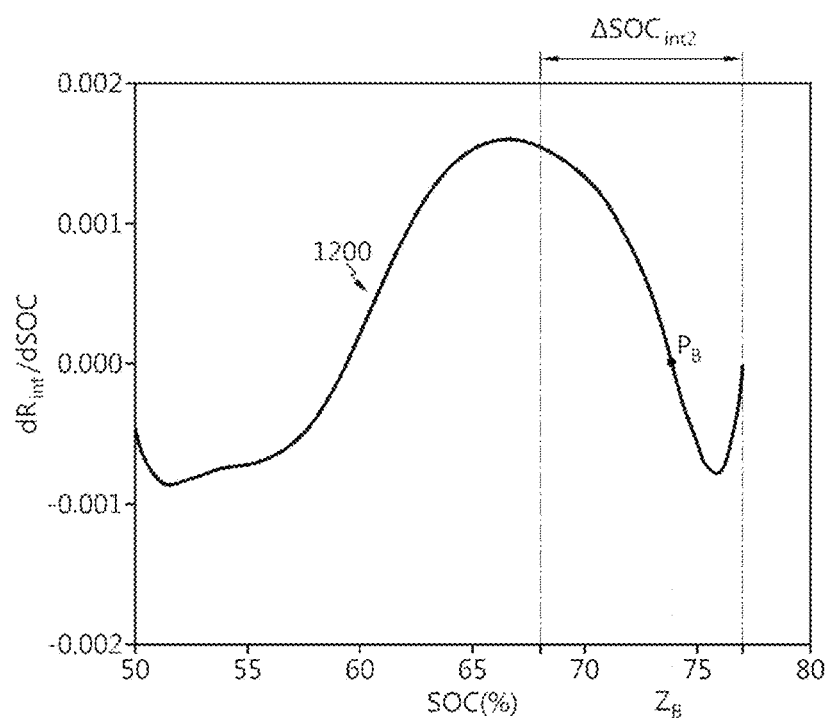

Next, the operation of identifying the DOC from the resistance profile 1000 of FIG. 10 obtained through curve fitting of the time series data set of FIG. 6 will be described. Referring to FIG. 10, the resistance profile 1000 is different from the resistance profile 900 illustrated in FIG. 9 in that the rate of increase in internal resistance gradually becomes gentler in the first half of the SOC range of interest ($\Delta SOC_{int2}$) and then gradually decreases starting from a specific SOC. As illustrated in FIG. 10, when the increase section and the decrease section of internal resistance are adjacent to each other, the controller 130 may obtain a differential resistance profile through a first-order differentiation for the resistance profile 1000 with respect to the SOC. For example, the differential resistance profile 1200 in FIG. 12 is illustrated as the result of the first-order differentiation for the resistance profile 1000 in FIG. 10. The controller 130 may determine the depth of charge ($Z_B$) to be equal to the SOC at a boundary point in the differential resistance profile 1200 where the differential resistance value ($dR_{CT}/dSOC$) transitions from positive to negative as the SOC increases, that is, a feature point (PB) where the differential resistance value ($dR_{CT}/dSOC$) is 0. The DOC ($Z_B$) determined from the differential resistance profile 1200 of FIG. 12 may be determined to be equal to the SOC at the boundary point between the increase pattern and the decrease pattern of internal resistance in the resistance profile 1000 of FIG. 10. For reference, a decrease pattern in a certain profile (or curve) may mean that the first-order derivative of the profile is negative.

Figure 13:
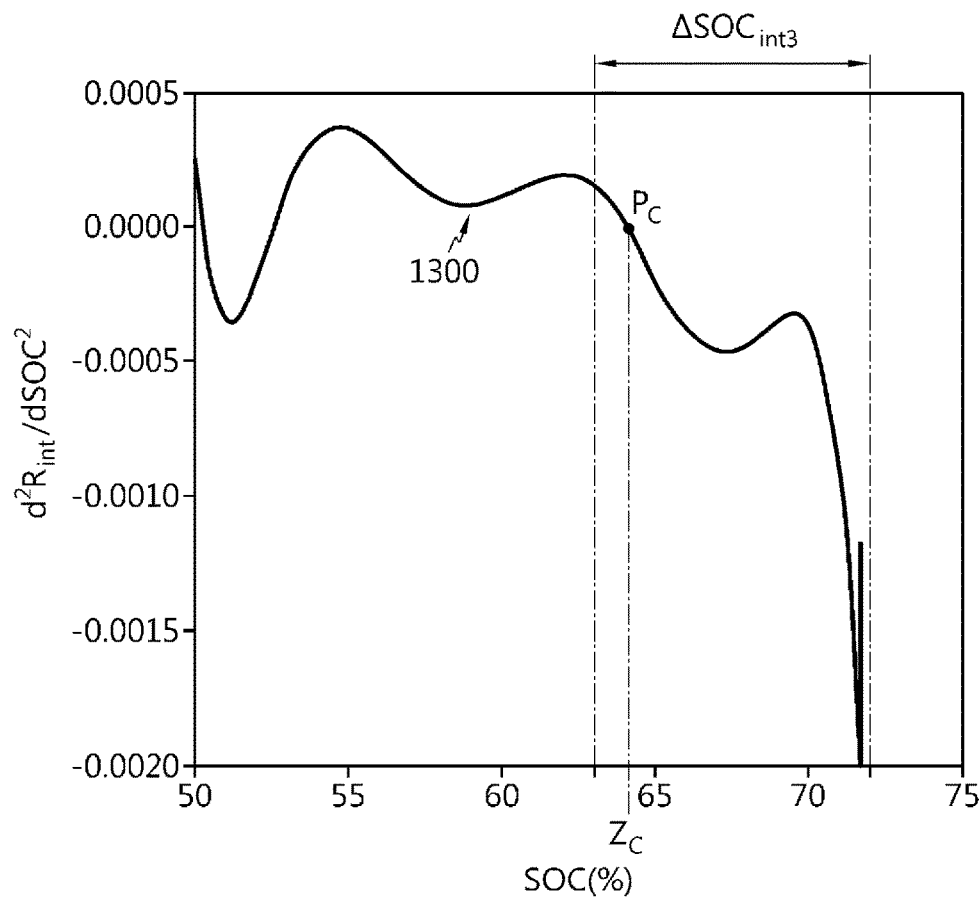

Next, the operation of identifying the DOC from the resistance profile 1100 of FIG. 11 obtained through curve fitting of the time series data set of FIG. 7 will be described. Referring to FIG. 11, the resistance profile 1100 is different from the resistance profile 900 of FIG. 9 and the resistance profile 1000 of FIG. 10 in that the internal resistance in the SOC range of interest ($\Delta SOC_{int3}$) continuously decreases without an increasing section. When the internal resistance shows only a decreasing pattern in the SOC range of interest as illustrated in FIG. 11, the controller 130 may obtain a differential resistance profile 1300 as illustrated in FIG. 13 through a second-order differentiation for the resistance profile 1100 with respect to the SOC. For reference, the differential resistance profile 1300 is different from the differential resistance profile 1200, which is a result of the first-order differentiation for the resistance profile 1000, in that the differential resistance profile 1300 is a result of the second-order differentiation for the resistance profile 1100.

The controller 130 may determine the depth of charge ($Z_C$) to be equal to the SOC at the point where the second-order differential resistance value ($d^2R_{CT}/dSOC^2$) from the differential resistance profile 1300 transitions from positive to negative as the SOC increases, i.e., at a feature point (Pc) where the second-order differential resistance value ($d^2R_{CT}/dSOC^2$) is 0. The feature point (Pc) may be the point where the absolute value of the resistance change rate is the largest in the resistance profile 1100.

The depths of charge ($Z_A$, $Z_B$, $Z_C$) illustrated in FIGS. 9 to 13 represent SOCs where a battery cell BC can be charged without lithium plating during constant current charging at current rates (e.g., 2 C) associated therewith, respectively. For example, when charging continues under the same charging progress conditions even though the SOC of a battery cell BC has reached the DOC, lithium plating may occur on the negative electrode surface of the battery cell BC.

The controller 130 may record the DOC determined for a specific charging progress condition in the memory 140. In the future, when charging of a battery cell BC is initiated under the same charging progress condition (e.g., the current rate and the battery temperature are 0.5 C and 25° C., respectively), the controller 130 may obtain the DOC (e.g., $Z_A$) associated with the charging progress condition from the memory 140 and permit the charging of the battery cell BC only until the SOC of the battery cell BC reaches the obtained DOC (e.g., $Z_A$). That is, when the SOC of the battery cell BC reaches the obtained DOC, the controller 130 may control the relay 20 to be turned off or transmit a request to stop charging to the charger 3.

The methods of FIGS. 2A, 2B, and 8 may be executed for each charging event of a battery 11. Alternatively, the methods may be executed under the condition that a predetermined diagnosis-requiring event occurs, for example, when the state of health (SOH) of the battery 11 decreases by a predetermined value or more from the previous SOH.

Figure 14:
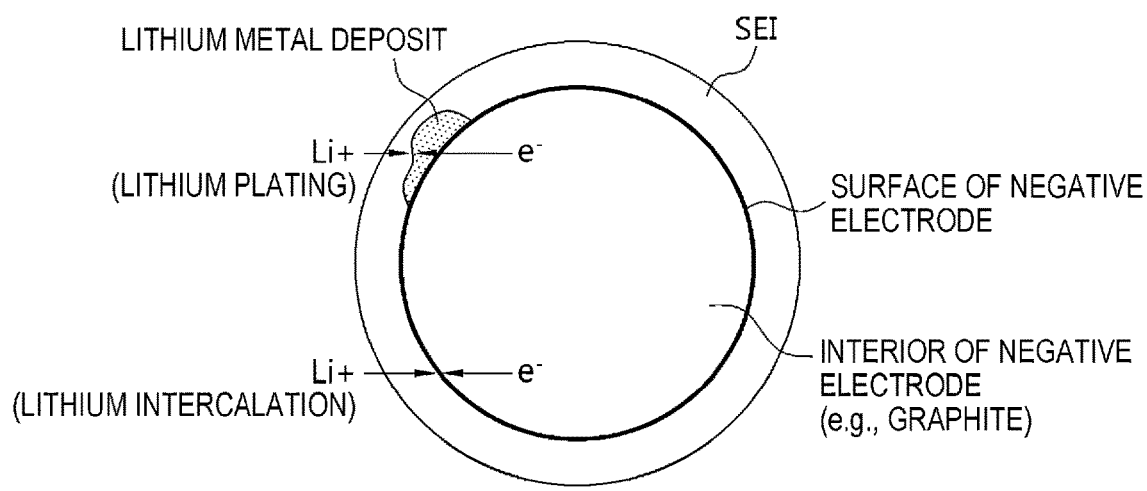
FIGS. 14 to 16 are views to be referenced in describing the relationship between lithium plating and impedance during battery charging.
Figure 15:
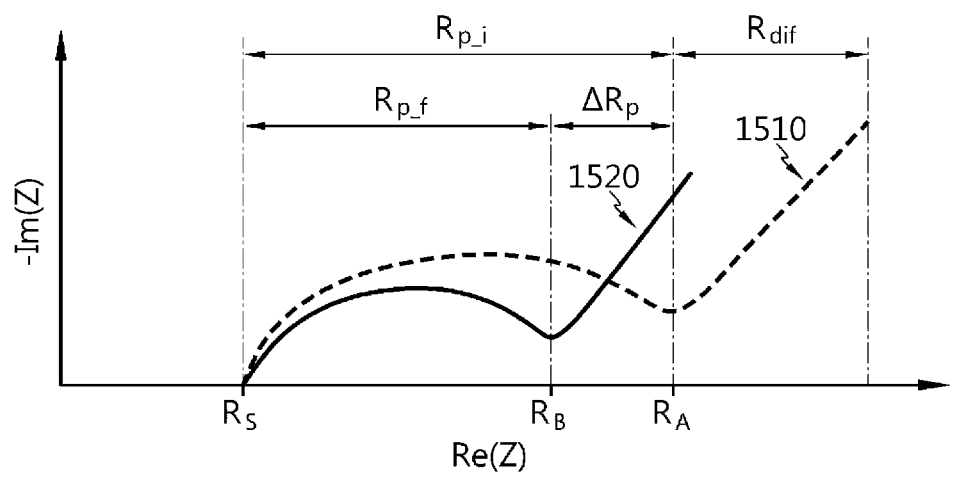
Figure 16:
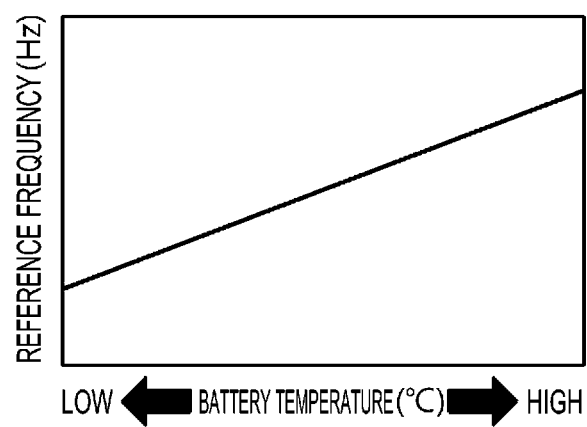

FIGS. 14 to 16 are views to be referenced in describing the relationship between lithium plating and impedance during battery charging.

First, FIG. 14 is a schematic diagram illustrating the formation of a lithium metal deposit on the negative electrode of a battery cell BC. Referring to FIG. 14, during charging under a certain charging progress condition, lithium ions may be plated as lithium metal on the surface of the negative electrode surface of a battery cell BC. When the lithium metal deposit is formed, lithium intercalation and lithium plating proceed simultaneously on the surface of the negative electrode of the battery cell BC, and thus the movement path of a charging current can be expanded compared to that in the case where there is no lithium metal deposit.

FIG. 15 is a graph to be referenced in exemplarily describing the change in impedance of a battery cell BC depending on the presence or absence of lithium plating in the battery cell BC. Each of two complex impedance curves 1510 and 1520 illustrated in FIG. 15 may be obtained by repeating the process of measuring the impedance of each battery cell when an AC signal is applied separately to a battery cell in which lithium plating is present and a battery cell in which lithium plating is absent using EIS equipment 4 under the same environmental condition. For example, FIG. 15 may be a Nyquist plot showing changes in impedance of battery cells depending on a change in the frequency of an AC signal. Since the process of obtaining a complex impedance curve of a battery cell BC is performed once before an intermittent charging process for the battery cell BC is initiated, and an AC signal from the EIS equipment 4 is applied to the battery cell BC only for a short period of time, the battery cell is substantially undamaged.

According to an embodiment, the complex impedance curve 1510 may be obtained for a battery cell before lithium plating occurs, and the complex impedance curve 1520 may be acquired for a battery cell after lithium plating occurs.

The symbol $R_S$ represents the electrolyte resistance of a battery cell, which is almost unaffected by the presence or absence of lithium plating. The symbols $R_{p\_i}$ and $R_{p\_f}$ each represent the interface resistances of a battery cell in which no lithium plating has occurred and a battery cell in which lithium plating has occurred, respectively. The symbols $R_A$ and $R_B$ each represent the internal resistances of a battery cell in which no lithium plating has occurred and a battery cell in which lithium plating has occurred, respectively, in which $R_A=R_S+R_{p\_i}$ and $R_B=R_S+R_{p\_f}$.

Interfacial resistance is the total resistance due to solid electrolyte interphase (SEI), charge transfer, and double layer, and is greatly affected by charge accumulation on the surfaces of the positive electrode and negative electrode of a battery cell.

As described above with reference to FIG. 14, the resistance of a lithium metal deposit on the surface of a negative electrode is combined in parallel with the resistance on the surface of the negative electrode. As a result, when a lithium metal deposit has been generated, the total resistance on the surface of the negative electrode of the battery cell may decrease. Therefore, as can be seen from FIG. 15, $R_{p\_f}$ is smaller than $R_{p\_i}$, and the resistance difference ($\Delta R_p$) therebetween can be said to have a positive correspondence relation with the generated amount of the lithium metal deposit.

Meanwhile, the controller 130 may determine a reference frequency from the complex impedance curve 1510. For example, the complex impedance curve 1510 may be divided into a convex section and a slope section. Here, the convex section may be a section associated with the interface resistance ($R_{p\_i}$). The slope section is a section with a linear general shape extending to the right of the convex section and represents the diffusion resistance ($R_{diff}$) of the battery cell. The frequency of an AC signal applied at the boundary point (see $R_A$) between these convex and slope sections may be determined as a reference frequency.

The inventor of the present disclosure has recognized that the SOC of a battery cell BC gradually increases during an intermittent charging process, and that the frequency at the boundary point between the convex section and the slope section gradually increases as the SOC increases. When the reference frequency is determined to correspond to the charging progress condition at the time where the intermittent charging process is initiated, a resting period provided during the intermittent charging process may continue for an appropriate period of time required to observe a voltage change due to the internal resistance of the battery cell BC. Therefore, it is possible to prevent the accuracy of internal resistance from being degraded due to the resting period set to be excessively short or long.

The controller 130 may determine a second reference period of time indicating the duration of the resting mode based on the reference frequency. The reference frequency and the second reference period of time may have a predetermined negative correspondence relationship. To determine the second reference period of time, relational data that can be expressed by Equation 2 below may be used.

$$\Delta t_{R2} = \frac{1}{f_{i-d}} \times w \qquad \text{(Equation 2)}$$

In Equation 2 above, $f_{i-d}$ represents the reference frequency, w represents a predetermined margin constant (which may be 1 or more), and $\Delta t_{R2}$ represents the second reference period of time. Therefore, the second reference period of time may be set to be equal to or greater than a value obtained by multiplying the reciprocal of the reference frequency ($f_{id}$) by the margin constant (w). The second reference period of time may be the duration for each resting period required to observe the voltage change due to the internal resistance of the battery cell BC.

In the memory 140, the reference frequency for each charging progress condition and the lower limit SOC may be recorded in advance. The controller 130 may determine the second reference period of time by obtaining the charging progress condition of an intermittent charging process to be performed for the battery cell BC and the reference frequency associated with the lower limit SOC of the SOC range of interest from the memory 140.

The memory 140 may store relational data among the SOC, the battery temperature, and the reference frequency. The relational data among the SOC, the battery temperature, and the reference frequency may be replaced with the relational data among the SOC, the battery temperatures, and the second reference period of time.

FIG. 16 is a graph to be referenced in describing the relationship between a battery temperature and a reference frequency when the SOC of the battery cell BC is set to a specific value (e.g., the lower limit SOC 10%).

Referring to FIG. 16, assuming that other factors (e.g., the current rate and the upper limit SOC) of a charging progress condition are the same, as the battery temperature under the charging progress condition increases, the reference frequency associated therewith may increase. That is, the battery temperature and the reference frequency may have a positive correspondence relationship.

Referring to Equation 2 described above, since the reference frequency and the second reference period of time are inversely proportional, when the battery temperature of the battery cell BC is high at the time at which control of the intermittent charging process is initiated, the duration of the resting mode (i.e., the second reference period of time) may be set to be short.

In FIG. 1, the charging control apparatus 100 is illustrated as being included as a sub-component of the battery system 1, but is not limited thereto. For example, the charging control apparatus 100 may be used as a sub-component of a charging performance tester to derive the DOC according to the charging progress condition of the battery cell BC. In this case, the charging performance tester may include a charging control apparatus 100 and a charger 3.

Figure 17:
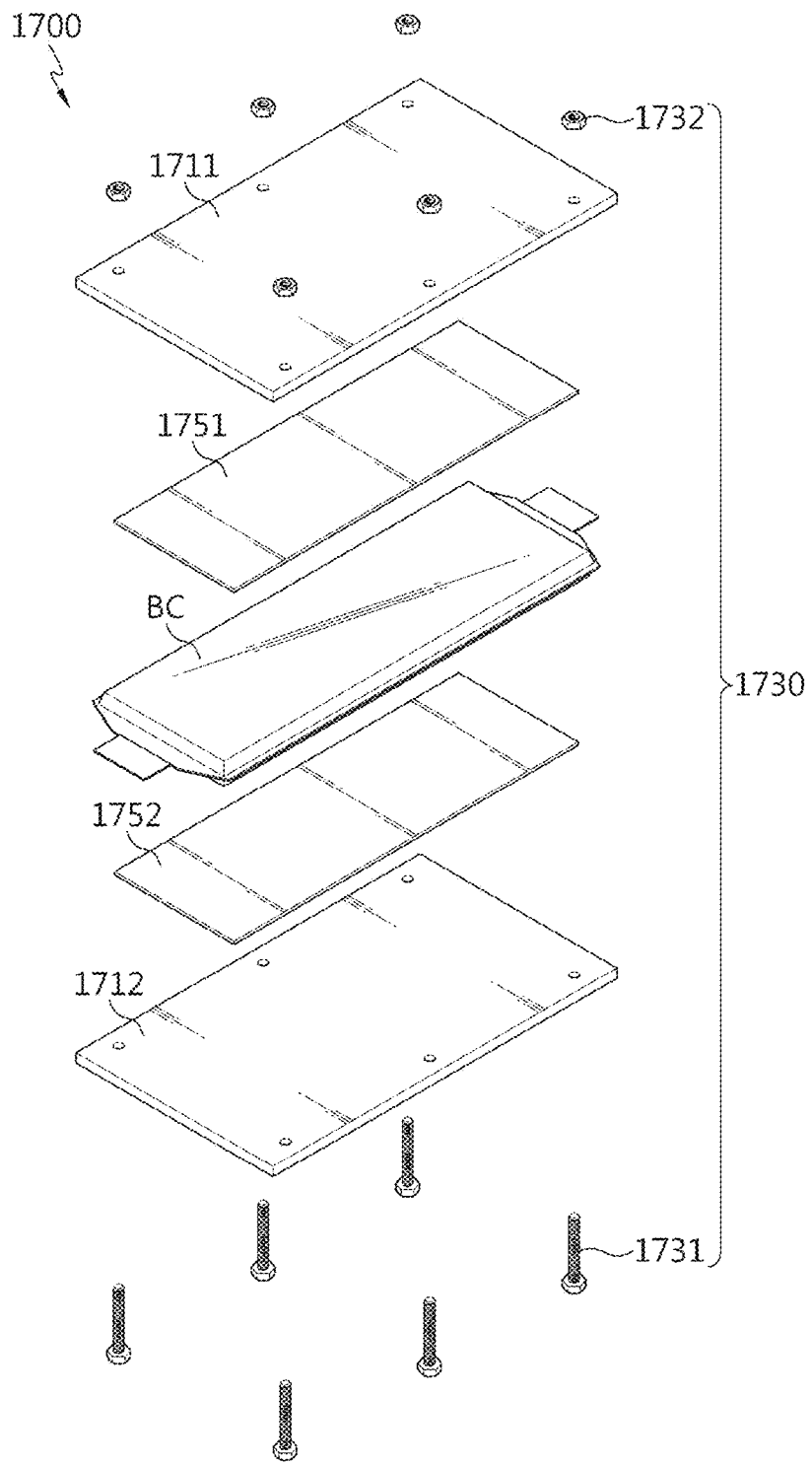
FIGS. 17 and 18 are views illustrating the structure of a test jig for a battery charging test.
Figure 18:
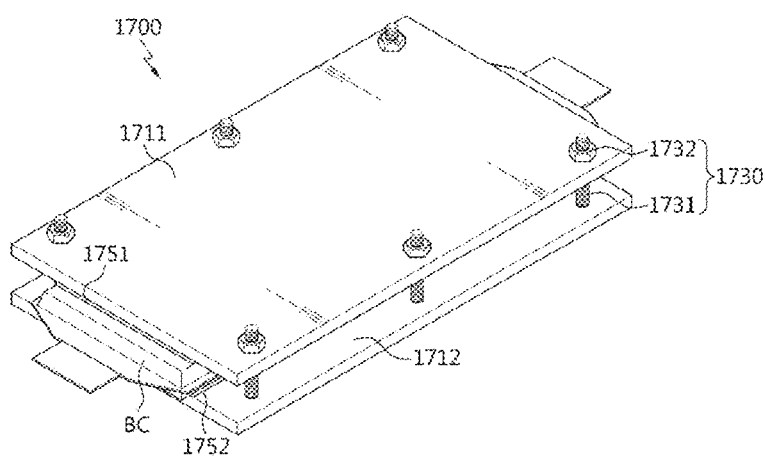

FIGS. 17 and 18 are views illustrating the configuration of a test jig for a battery charging test.

Referring to FIGS. 17 and 18, a test jig 1700 includes a first plate 1711, a second plate 1712, and a coupling member 1730. The coupling member 1730 includes one or more bolts 1731 and nuts 1732. The charging control apparatus 100 used as a charging tester may execute the above-described intermittent charging process to derive a fast charging protocol for a battery cell BC coupled to the test jig 1700. At this time, another charger with a function corresponding to the charger 3 may be separately provided for supplying a charging current.

The first plate 1711 and the second plate 1712 are disposed on the opposite sides (e.g., top and bottom) of the battery cell BC. One or more coupling holes are formed in each of the first plate 1711 and the second plate 1712. The threads of the bolts 1731 penetrate the coupling holes formed in each of the second plate 1712 and the first plate 1711, and the nuts 1732 are rotationally coupled to the distal ends of the threads of the bolts 1731, respectively. FIG. 17 illustrates the state where 6 bolts and 6 nuts are coupled to each other a one-to-one basis. Accordingly, a battery cell BC may be firmly fixed between the first plate 1711 and the second plate 1712.

The test jig 1700 may further include one or more foam pads 1751 and 1752. The foam pads 1751 and 1752 may be provided for an insulation purpose to prevent heat generated from the battery cell BC from being released to the outside during charging. As an example, the fastening between the test jig 1700 and the battery cell BC may be completed by inserting the foam pad 1751 between the first plate 1711 and the battery cell BC, pressing the first plate 1711 and the second plate 1712 on the opposite sides in the state where the foam pad 1752 is inserted between the second plate 1712 and the battery cell BC using coupling members. It is noted that only one of the two foam pads 1751 and 1752 may be inserted between the first plate 1711 or the second plate 1712 and the battery cell BC, or both the foam pads 1751 and 1752 may not be inserted. When only one of the two foam pads 1751 and 1752 is inserted, heat is dissipated from the battery cell BC to the outside more smoothly than when both the foam pads 1751 and 1752 are inserted. In addition, when both the foam pads 1751 and 1752 are not inserted, heat dissipation from the battery cell BC to the outside is maximized compared to the case where only one of the two foam pads 1751 and 1752 is inserted. For example, by varying heat generation environments during charging of the battery cell BC by varying the insertion conditions of the two foam pads 1751 and 1752, the DOC may be derived for each heat generation environment.

Figure 19:
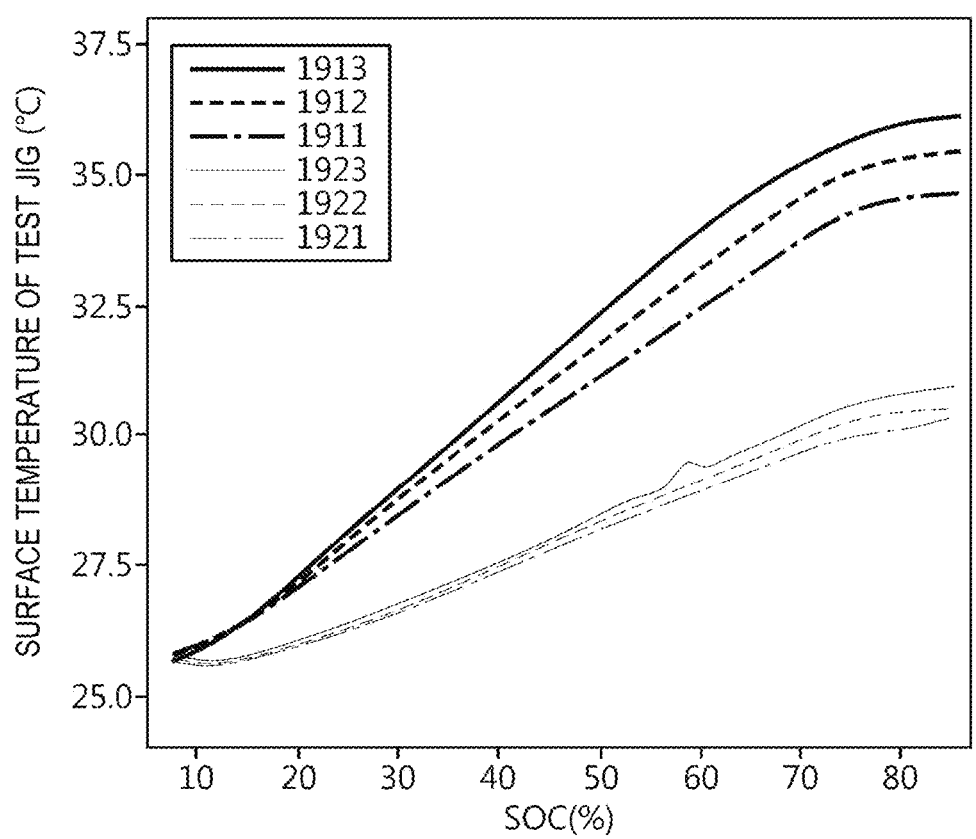
FIGS. 19 and 20 are views to be referenced in describing the results of a charging test using the test jig illustrated in FIGS. 17 and 18.
Figure 20:
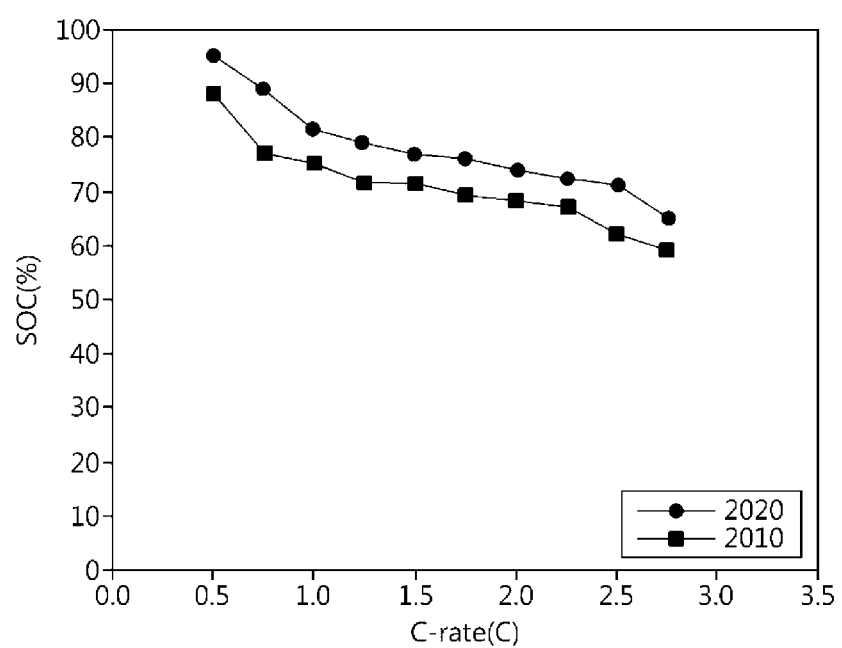

FIGS. 19 and 20 are views to be referenced in describing the results of a charging test using the test jig illustrated in FIGS. 17 and 18.

First, referring to FIG. 19, three temperature curves 1911, 1912, and 1913 are graphs illustrating changes in the surface temperature of the test jig 1700 with respect to SOC when the battery cell BC is charged from SOC 0% to SOC 100% with three current rates of 2.25 C, 2.5 C, and 2.75 C in the state where the battery cell BC is fastened to the test jig 1700 in which both the foam pads 1751 and 1752 are not inserted. The surface temperature of the test jig 1700 may be measured using a temperature sensor inserted into the test jig 1700 or placed within a predetermined distance from the test jig 1700.

The remaining three temperature curves 1921, 1922, and 1923 are graphs illustrating changes in cell temperature with respect to SOC when the battery cell BC is charged from SOC 0% to SOC 100% with three current rates of 2.25 C, 2.5 C, and 2.75 C in the state where the battery cell BC is fastened to the test jig 1700 in which both the foam pads 1751 and 1752 are inserted.

Comparing the temperature curves 1911, 1912, and 1913 and the temperature curves 1921, 1922, and 1923, it can be seen that there is a difference in the heat generation environment during the charging of the battery cell BC depending on whether the foam pads 1751 and 1752 are inserted, and as a result, a temperature difference of about 5° C. occurs in the late charging period.

Next, referring to FIG. 20, each of the two SOC curves 2010 and 2020 is a graph showing a change in DOC obtained through a charging test using a plurality of current rates selected from the range of 0.5 C to 2.75 C one at a time in the state where a battery cell BC is fastened to the test jig 1700.

The SOC curve 2010 illustrates a change in DOC depending on a current rate when the battery cell BC is fastened to the test jig 1700 in which both the foam pads 1751 and 1752 are not inserted.

The SOC curve 2020 illustrates a change in DOC depending on a current rate when the battery cell BC is fastened to the test jig 1700 in which both the foam pads 1751 and 1752 are inserted.

Comparing the two SOC curves 2010 and 2020, when the foam pads 1751 and 1752 are inserted, since the heat generated during charging of the battery cell BC placed inside the test jig 1700 is insulated by the two foam pads 1751 and 1752, the battery cell BC is charged at a higher temperature compared to the case where the foam pads 1751 and 1752 are not inserted. It can be seen that, due to the insulation effect when the foam pads 1751 and 1752 are inserted, the increase in the surface temperature of the test jig 1700 is decreased by about 5° C. while the DOC is increased compared to the case where the foam pads 1751 and 1752 are not inserted.

In contrast, when both the foam pads 1751 and 1752 are not inserted, since the heat generated during charging of the battery cell BC is conducted to the first plate 1711 and the second plate 1712 and is quickly dissipated to the outside, the surface temperature of the test jig 1700 is observed to be relatively high compared to the case where the foam pads 1751 and 1752 are inserted. Accordingly, compared to the case where the foam pads 1751 and 1752 are inserted, the temperature increase due to heat generation of the battery cell BC is eliminated, and the DOC is decreased.

Figure 21:
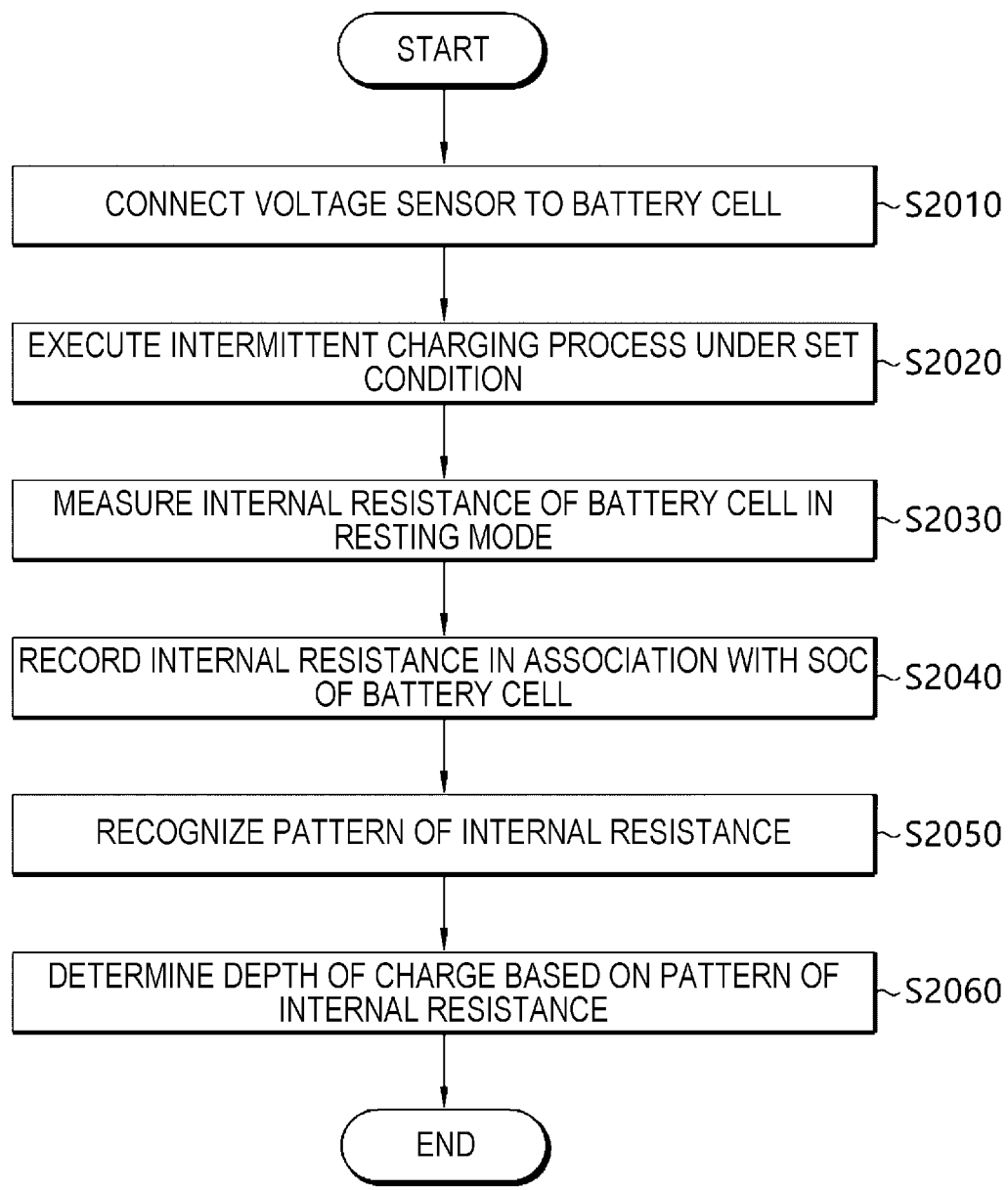
FIG. 21 is a flowchart illustrating a method of measuring the DOC of a battery cell of the present disclosure.

FIG. 21 is a flowchart illustrating a method of measuring the DOC of a battery cell of the present disclosure.

In S2010, a voltage sensor is connected to the battery cell in S2010. Referring to FIG. 1, in order to measure the DOC of the battery cell BC, the voltage sensor 111 is first connected to the battery cell BC in parallel. Then, in S2020, an intermittent charging process is performed on the battery 11 using the charging control apparatus 100 under a preset condition, for example, at a set current rate and temperature.

In S2030, the internal resistance of the battery cell is measured based on the voltage change of the battery cell in the resting mode of the intermittent charging process, and in S2040, the measured internal resistance is recorded in association with the SOC of the battery cell to derive a graph of internal resistance and SOC. For example, the controller 130 may derive the graphs of FIGS. 5 to 7 described above by associating the measured internal resistance to the SOC of the battery cell. Meanwhile, based on the graph derived from S2040, a differentiated graph may be derived by performing curve fitting and differentiating internal resistance with respect to SOC based on the graph derived in S2040.

In S2050, the pattern of internal resistance depending on a change in SOC is recognized based on the derived graph. For example, the intermittent charging process performed under the condition of FIG. 5 shows a pattern in which the internal resistance decreases when the SOC is in the section of about 50% to 65% and then increases from 65%.

In S2060, the DOC is determined based on the recognized pattern of internal resistance. For example, when the pattern of FIG. 5 described above is recognized, the DOC may be determined to be the same value as the charging limit SOC (the upper limit of the SOC range of interest), for example, about 95%.

The above-described embodiments of the present disclosure are not only implemented through apparatuses and methods, but may also be implemented through a program that implements the functions corresponding to the configuration of the embodiment of the present disclosure or a recording medium recorded with the program. This may be easily implemented by a person ordinarily skilled in the technical field to which the present disclosure belongs based on the description of the embodiments described above.

While the present disclosure has been described above with reference to several embodiments thereof, the present disclosure is not limited by the embodiments, and various changes and modifications can be made by a person ordinarily skilled in the art to which the present disclosure pertains without departing from the technical spirit and equivalent scope of the present disclosure defined by the appended claims.

In addition, since various substitutions, modifications, and changes can be made on the present disclosure described above without departing from the technical spirit of the present disclosure by a person ordinarily skilled in the art to which the present disclosure pertains, the present disclosure is not limited by the above-described embodiments and the accompanying drawings, but all or some of respective embodiments can be selectively combined such that various modifications can be made.

What is claimed is:

1. A charging control apparatus comprising:
    a voltage sensor configured to detect a voltage of a battery cell; and
    a controller configured to execute an intermittent charging process to alternately repeat a charging mode and a resting mode for the battery cell,
    wherein, under a condition that switching from the charging mode to the resting mode is performed while the intermittent charging process is being executed, the controller is configured to execute:
    an operation of determining an internal resistance of the battery cell based on an amount of change in voltage of the battery cell in a resting period, wherein the resting period is from a first time point at which the charging mode transitions to the resting mode until a second time point at which the resting mode transitions back to the charging mode;
    an operation of recording the internal resistance in association with a State of Charge (SOC) of the battery cell; and
    an operation of determining a depth of charge (DOC) of the battery cell by analyzing a resistance time series data set representing a history of change in the internal resistance over a charging control period from initiation to termination of the intermittent charging process, wherein the DOC indicates a maximum SOC to which the battery cell can be charged without occurrence of lithium plating.

2. The charging control apparatus according to claim 1, wherein the charging mode is a mode in which a charging current with a predetermined current rate is supplied to the battery cell.

3. The charging control apparatus according to claim 1, wherein the controller is configured to control the intermittent charging process to be switched from the charging mode to the resting mode when the duration of the charging mode reaches a first reference period of time or when an amount of increase in the SOC of the battery cell due to the charging mode reaches a reference increase amount.

4. The charging control apparatus according to claim 1, wherein the controller is configured to control the intermittent charging process to be switched from the resting mode to the charging mode when the duration of the resting mode reaches a second reference period of time.

5. The charging control apparatus according to claim 4, wherein the controller is configured to: determine a reference frequency from a complex impedance curve of the battery cell obtained in advance using electrochemical impedance spectroscopy (EIS) equipment; and
    determine the second reference period of time based on the reference frequency.

6. The charging control apparatus according to claim 5, wherein the controller is configured to determine the second reference period of time to have a predetermined negative correspondence relationship with the reference frequency.

7. The charging control apparatus according to claim 1, wherein the controller is configured to:
    perform curve fitting on the resistance time series data set to generate a resistance profile representing a relationship between the SOC and the internal resistance of the battery cell; and
    determine the DOC based on a pattern of the resistance profile.

8. The charging control apparatus according to claim 7, wherein, when only a continuous increase pattern in the internal resistance is identified in the resistance profile, the controller is configured to determine the DOC to be equal to a predetermined charging termination SOC.

9. The charging control apparatus according to claim 7, wherein, when a transition from an increase pattern to a decrease pattern of the internal resistance is identified in the resistance profile, the controller is configured to determine the DOC based on a boundary SOC between the increase pattern and the decrease pattern.

10. The charging control apparatus according to claim 7, wherein, when only a continuous decrease pattern of the internal resistance is identified in the resistance profile, the controller is configured to determine the DOC based on the SOC at which a second-order derivative of the resistance profile becomes 0.

11. A battery pack comprising the charging control apparatus of claim 1.

12. A battery system comprising the charging control apparatus of claim 1.

13. A charging control method comprising:

executing an intermittent charging process to alternately repeat a charging mode and a resting mode for a battery cell, wherein, under a condition that switching from the charging mode to the resting mode is performed while the intermittent charging process is being executed, the charging control method further comprises:

determining an internal resistance of the battery cell based on an amount of change in voltage of the battery cell in a resting period, wherein the resting period is from a first time point at which the charging mode transitions to the resting mode until a second time point at which the resting mode transitions back to the charging mode;

recording the internal resistance in association with a State of Charge (SOC) of the battery cell; and determining a depth of charge (DOC) of the battery cell by analyzing a resistance time series data set representing a history of change in the internal resistance over a charging control period from initiation to termination of the intermittent charging process, wherein the DOC indicates a maximum SOC to which the battery cell can be charged without occurrence of lithium plating.

* * * * *